United States Patent
Pretzer et al.

[11] Patent Number: 6,020,455
[45] Date of Patent: Feb. 1, 2000

[54] VINYL CYCLOHEXANEDIOL CONTAINING RESIN COMPOSITIONS

[75] Inventors: Wayne Robert Pretzer, Wheaton; Matthew Albert Kulzick, Warrenville, both of Ill.; Paul Alan Koning, Cumming, Ga.; Asare Nkansah; Maria Curry-Nkansah, both of Naperville, Ill.

[73] Assignee: BP Amoco Corporation, Chicago, Ill.

[21] Appl. No.: 09/021,779

[22] Filed: Feb. 11, 1998

Related U.S. Application Data

[60] Provisional application No. 60/039,701, Feb. 13, 1997, and provisional application No. 60/041,982, Apr. 16, 1997.

[51] Int. Cl.[7] .................................................. C08G 63/00
[52] U.S. Cl. ...................... 528/307; 528/272; 528/283; 528/296; 528/302; 528/308; 528/308.6; 428/221; 428/480
[58] Field of Search .................... 528/272, 283, 528/296, 302, 308, 308.6, 307; 428/221, 480

[56] References Cited

U.S. PATENT DOCUMENTS 4,593,121  6/1986  Okamoto et al. ..................... 560/144

FOREIGN PATENT DOCUMENTS 1263297  3/1968  Germany.
61195104  8/1986  Japan.

Primary Examiner—Samuel A. Acquah
Attorney, Agent, or Firm—James R. Henes; Stephen L. Hensley

[57] ABSTRACT

A copolymer containing vinyl-3,4-cyclohexanediol and at least one monomer selected from acrylic acid, methacrylic acid, alkyl acrylate, alkyl methacrylate, styrene, acrylonitrile, butadiene, isoprene, vinyl acetate, maleic anhydride, ethylene, vinyl chloride, vinylidene dichloride, methyl styrene, vinyl toluene, acrylic and methacrylic acid, vinyl acetate, maleic anhydride, fumarate esters, maleate esters, vinylidene difluoride, vinyl fluoride, acrylic or methacrylic esters of the formula (I)

$$H_2C=CHCOOR \text{ or } H_2C=CCH_3COOR \qquad (I)$$

where R is a aromatic or aliphatic hydrocarbon group containing 20 or fewer carbons and optionally containing oxygen, sulfur, or phosphorous, and mixtures thereof. A resin composition containing vinyl-3,4-cyclohexanediol, at least one carboxylic acid or ester thereof or anhydride, and optionally a polyol or diol other than vinyl-3,4-cyclohexanediol. A process for preparing this resin composition which involves mixing in a nitrogen atmosphere vinyl-3,4-cyclohexanediol, at least one carboxylic acid or ester thereof or anhydride, and optionally a polyol or diol other than vinyl-3,4-cyclohexanediol to form a mixture and heating the mixture to about 180°–290° C. until the desired level of polymerization is reached to form the resin composition. A copolymer containing the vinyl-3,4-cyclohexanediol containing resin composition and at least one monomer selected from acrylic acid, methacrylic acid, alkyl acrylate, alkyl methacrylate, styrene, acrylonitrile, butadiene, isoprene, vinyl acetate, maleic anhydride, ethylene or mixtures thereof.

6 Claims, 7 Drawing Sheets

Scanning Electron Micrographs of Fracture Surfaces, 5000x
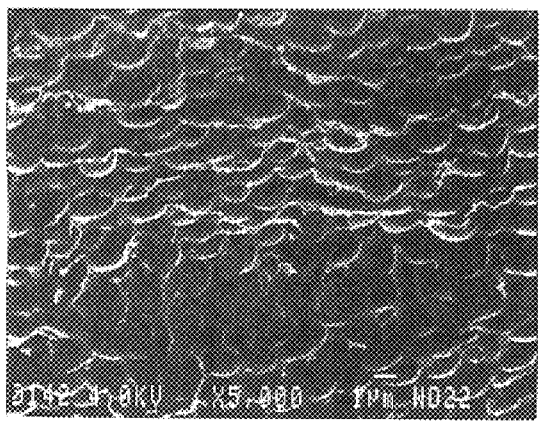
1:1 Polyester:PMMA
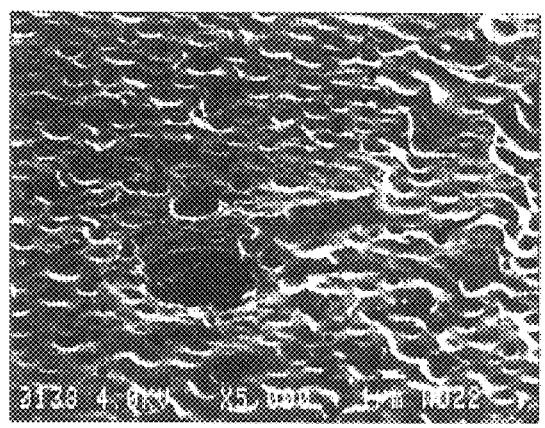
With VCHD
1:1 Polyester:PMMA
FIG. 2

VINYL CYCLOHEXANEDIOL CONTAINING RESIN COMPOSITIONS

REFERENCE TO RELATED APPLICATIONS

This application claims the benefits of U.S. Provisional Applications Ser. No. 60/039,701 filed Feb. 13, 1997, and 60/041,982 filed Apr. 16, 1997, which are incorporated herein by reference in their entirety.

BACKGROUND AND INTRODUCTION

The present invention relates to grafted polymer compositions containing vinyl-3,4-cyclohexanediol (VCHD). Furthermore, the present invention relates to polymeric and oligomeric resin compositions (e.g., polyesters, acrylates, and other vinyl polymers) containing vinyl-3,4-cyclohexanediol (VCHD). The present invention also concerns grafted polymer compositions prepared from such resin compositions.

Currently, various diols and polyols are reacted with di- and poly-carboxylic acids to form polyester and alkyd resins used in coating applications. Diols and polyols commonly used include neopentyl glycol (NPG), trimethyolpropane (TMP), pentaerythritol (PET), glycerol, ethylene glycol, polyethylene glycol, propylene glycol, polypropylene glycol, butanediol, 1,6-hexanediol, and 1,4-cyclohexanedimethanol (CHDM). All of these diols and polyols are aliphatic and, with the exception of CHDM, are acyclic.

Traditionally, formulators in the film forming and coating application fields have relied on two classes of polyacids, namely aromatic and saturated linear aliphatics, to meet their technical requirements. Aromatic intermediates generally produce resins for films and coatings that are hard, resistant to moisture and solvents, and have a high glass transition temperature ($T_g$). However, aromatic intermediates suffer from a UV radiation absorption problem and thus do not "weather" well. Furthermore, films produced from such aromatic intermediates are often brittle.

Aliphatic intermediates on the other hand are nearly transparent in the UV region and thus possess improved weatherability. Furthermore, the linear aliphatics have also been found to improve the flexibility of films and coatings. However, the resins produced from such linear aliphatics have been found to exhibit lower $T_g$, reduced hardness, and reduced resistance to chemicals. The glass transition temperature of a resin is particularly important for powder coating applications because a resin with too low a $T_g$ will sinter during storage and become unusable.

Thus, from an economic perspective, prior art compositions often represent a compromise in which one property is enhanced at the expense of another property.

SUMMARY OF THE INVENTION

The resin compositions according to the present invention contain vinyl-3,4-cyclohexanediol, at least one carboxylic acid (or ester thereof) or anhydride, and optionally a polyol or diol other than vinyl-3,4-cyclohexanediol.

Such resin compositions are prepared by mixing in a nitrogen atmosphere vinyl-3,4-cyclohexanediol, at least one carboxylic acid (or ester thereof) or anhydride, and optionally a polyol or diol other than vinyl-3,4-cyclohexanediol to form a mixture and heating the mixture to about 180°–about 290° C. until the desired level of polymerization is reached to form the resin composition.

Copolymers are formed from the resin compositions described above and at least one monomer, such as acrylic acid or methacrylic acid, known in the art that is readily polymerized by free radical mechanisms. Such copolymers are prepared by reacting the vinyl-3,4-cyclohexanediol containing resin composition and at least one monomer selected from acrylic acid, methacrylic acid, alkyl acrylate, alkyl methacrylate, styrene, acrylonitrile, butadiene, isoprene, vinyl acetate, maleic anhydride, ethylene, vinyl chloride and mixtures thereof. The copolymers may be used in films or coatings.

BRIEF DESCRIPTION OF THE DRAWINGS

The present invention will be further understood from a study of the drawings, wherein

FIG. 2 represents scanning electron micrographs of fracture surfaces (5000×) for experiments 142 (left) and 138 (right) described in Tables 3 and 4;

DETAILED DESCRIPTION OF THE INVENTION

Figure 1:
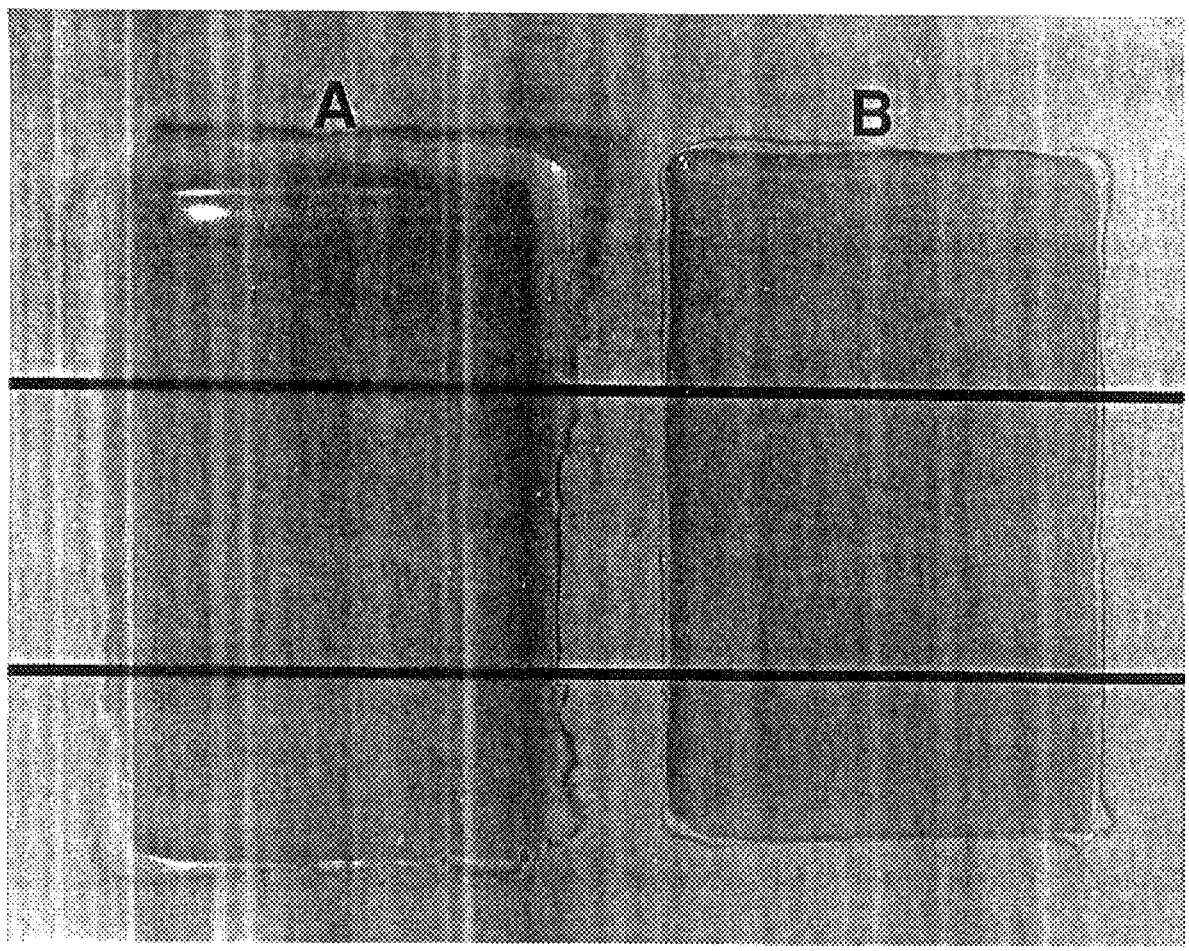
FIG. 1(A) represents a somewhat opaque and hazy film produced in a hybrid system prepared from the polyester of Control Example 1 and methylmethacrylate.
FIG. 1(B) depicts a clear and transparent film produced in a hybrid system according to the present invention prepared from the polyester of Example 3 and methylmethacrylate.

The present invention provides polymer compositions useful for coatings comprising polyester, alkyd, acrylic, and other vinyl polymer resins incorporating VCHD units into the polymer backbone. The polymers are formed primarily by reaction of the hydroxy groups of VCHD with organic di- or poly-carboxylic acids (or esters thereof) or anhydrides or the reaction of the vinyl group of VCHD with other vinyl monomers. Polyols and diols other than VCHD may also be utilized in the resin composition.

Vinyl-3,4-cyclohexanediol (VCHD) is a chemical intermediate which has a number of interesting properties, including aliphatic structure, reactive vinyl group, and diol functionality. Surprisingly, VCHD incorporates easily into low molecular weight polyesters. If handled in the absence of oxygen, VCHD does not readily form color even when exposed to high temperatures for prolonged periods of time.

German Patent 1,263,297 discloses a VCHD containing polyester produced from (1) saturated diols and dicarbonic acids, (2) α,β-unsaturated dicarbonic acids (e.g., fumaric acid), and (3) other unsaturated compounds via the addition of certain brominatable dicarbonic acids and diols (e.g., VCHD). The VCHD containing polyester was subsequently brominated and then reacted with styrene to produce a flame resistant polyester molded product. However, the VCHD containing polyester of the present invention does not involve α,β-unsaturated dicarbonic acids (e.g., fumaric acid, maleic acid); furthermore, the VCHD containing polyester of the present invention is not halogenated (e.g., brominated) prior to production of a copolymer (e.g., by reaction of the VCHD containing polyester with, for example, styrene). Thus, the present copolymer made from the VCHD containing polyester of the present invention does not contain halogens (e.g., bromine).

The VCHD monomer produces resins for coatings that have a superior balance of hardness and flexibility relative to existing acyclic, aliphatic diols. Furthermore, the cycloaliphatic character of VCHD increases the $T_g$ of resins made with this monomer compared to existing acyclic diols. Improved humidity and UV resistance of such resins was observed because this diol imparts greater aliphatic character (i.e., increased ratio of hydrocarbon, $CH_x$, to —OH) compared to other diols. Compared to 1,4-cyclohexanedimethanol, VCHD has a carbon-carbon double bond that allows additional curing chemistries such as air cure or UV cure which leads to improved stain and etch resistance by increasing crosslink density of the cured resin. Furthermore, the double bond can be used as the site for additional chemistry such as grafting monomers (e.g., acrylic and methacrylic monomers) for unique polyester-monomer hybrids (e.g., polyester acrylic hybrids). The new system combines the strengths of both resin types and produces a coating with unexpectedly superior flexibility, weatherability, clarity and gloss. Vinyl acetate monomer can also be grafted to change properties and reduce raw material costs.

The present polyester compositions are useful and unique in several ways. Incorporation of VCHD into a polyester increases glass transition temperature as illustrated by the comparison of example 4 and control example 2 described below. Glass transition temperature is important for product characteristics such as hardness, gloss, and scratch resistance in coatings and gas barrier properties in packaging resins. This increase in glass transition temperature was surprising since most aliphatic diols tend to reduce $T_g$.

Compatibility of these polyesters with other polymer types is another distinction between polymers prepared with and without VCHD. Polymerization of acrylic or methacrylic monomer in the presence of VCHD containing polyester results in the formation of hybrid systems which have surprisingly good optical clarity. When this polymerization is done with polyesters which do not contain VCHD, cloudy products are obtained as shown in FIG. 1. Poor clarity or haze is a significant problem with current polyester/acrylic hybrids used in coatings. Without being bound by theory, the clarity of the present hybrid structures is believed due to in situ formation of polyester/acrylic or methacrylic copolymers. Acrylic or methacrylic polymer radicals react with the pendant vinyl group of VCHD, thus acting to compatibilize the system and giving the resultant clarity. In the absence of the vinyl group, the resultant polymer mixture is hazy, indicating incompatibility.

In addition to acrylic and methacrylic hybrids, similar results can be expected with other monomers such as styrene, acrylonitrile, butadiene, isoprene, vinyl acetate, ethylene, and other monomers known in the art that are readily polymerized by free radical mechanisms. By varying the monomer, the polyester composition, and the relative amounts of these two materials, it is possible to produce compositions and properties to meet a very wide range of applications.

Incorporation of the VCHD unit into the polyester yields additional potential performance advantages. The pendant vinyl group of the VCHD is reactive with oxygen, especially in the presence of a catalyst such as cobalt(II) and Mg and Zr salts, and can be used as a curing mechanism to toughen a coating or resin or to improve barrier properties in packaging applications by producing a polymer which reacts with oxygen. Polymers containing VCHD can be crosslinked with themselves or other polymers. These properties can be important in a wide variety of applications such as an interior can coating which slowly adsorbs oxygen from material packaged in the container, thus resulting in significantly increased shelf life. In addition, polyesters containing VCHD could be crosslinked with rubbers such as polybutadiene or polyisoprene to yield materials with improved adhesion and other physical properties.

Polyesters containing VCHD can be prepared according to traditional methods used for synthesis of polyester resins. Such polyester resin formulations are typically used in the coating industry but can also be used in other areas such as packaging or fiber. The desired amounts of reactants (e.g., diols, polyols, carboxylic acids) are charged to a reaction vessel equipped with an agitator, a means of heating, a nitrogen sparge, a condenser and water trap. Such equipment is well known in the art. The diacids typically dissolve in the diols and then react with the elimination of water. A condensation catalyst such as a hydrated butyl tin oxide (e.g., Fascat 4100 which is commercially available from Atochem) is added at a concentration of about 0.1% by weight to aid in the esterification of the secondary hydroxyl groups of VCHD. The system is purged with nitrogen and the reactants are heated to about 180°–about 290° C. until the desired level of polymerization is reached (as determined, for example, by molecular weight and acid number or hydroxyl number; such methods of determining a level of polymerization are well known in the art); the desired level of polymerization is generally a function of the application of the compound, for example, for polyester coatings the $M_n$ is 1–3000.

Water is collected to monitor the rate of polymerization. An acid number is measured near the end of the polymerization to indicate completeness. The VCHD can be about 1–100% of the diol/polyol component. VCHD can be used in combination with another diol or polyol such as neopentyl glycol but this is not a requirement since polyester resins can be produced with only VCHD as the diol. If VCHD is used in combination with another diol or polyol, then all of the VCHD can be added first followed by all of the other diol or polyol, or these components can be added together. Preferably, VCHD is used in combination with another diol or polyol.

Condensation catalysts other than hydrated butyl tin oxide (e.g., Fascat 4100) can also be used. Such catalysts are known in the art and include, for example, sulfuric acid, sulfonic acids, tin salts, Co, Mn or Ca acetate.

The carboxylic acids (and esters thereof) and anhydrides that can be reacted with VCHD to form polyester resins include, but are not limited to, phthalic anhydride, terephthalic acid, isophthalic acid, trimellitic anhydride, adipic acid, 1,4-cyclohexanedicarboxylic acid, and maleic anhydride. Esters include, for example, dialkylterephthalate, dialkylisophthalate, and dialkyladipate where the alkyl can be, for example, lower alkyl such as methyl.

Other diols and polyols that can be used in addition to VCHD to vary the properties of the polyester resin include, but are not limited to, neopentyl glycol, ethylene glycol, polyethylene glycol, propylene glycol, polypropylene glycol, 1,4-butanediol, 1,6-hexanediol, glycerol, trimethylolpropane, trimethylolethane, pentaerythritol, 1,4-cyclohexanedimethanol, 2-methyl-1,3-propanediol, and 1,3-propanediol.

The product resin can be either a polyester polyol (i.e., a polyester with free —OH groups) or a carboxylated polyester (i.e., a polyester with free —COOH groups). The product resin is determined by controlling the ratio of —OH groups (diol/polyol content) to —COOH groups (di-/polyacid content) charged to the reaction vessel. The presence or absence of branching in the product resins can also be controlled by the proper addition of either polyols or polycarboxylic acids.

The amount of VCHD incorporated in the resin can range from about 1 mole % to 66 mole %, especially 5 mole % to 66 mole %. The molecular weight of the resins can range from about 500 to about 100,000 daltons. The molecular weight for most coating applications will be in the range of about 500 to about 20,000 daltons. Many applications will use resins in the molecular weight range of about 1,000 to about 5,000 daltons.

Vinyl acetate, alkyl acrylates (e.g., $C_{30}$ or below, $C_8$ or below, especially $C_4$ or below such as butyl; hydroxyl alkyl or gylcidyl alkyl), alkyl methacrylates (e.g., $C_{30}$ or below, $C_8$ or below, especially $C_4$ or below such as methyl; hydroxyl alkyl or gylcidyl alkyl), acrylonitrile, styrene, and dialkyl maleates and fumarates can also be grafted to the reactive site of the VCHD unit in the product resins.

The resins can be designed for use in waterborne polyester coatings, high solids polyester-based coatings, and various polyester and hybrid powder coatings. Besides the conventional curing agents currently used with polyester-based coatings, which are well known in the art, the carbon-carbon double bond in VCHD allows additional curing chemistries such as air or UV cure. The double bond is also the site for grafting acrylic and/or methacrylic monomers to generate unique polyester-acrylic hybrids. Vinyl acetate, maleic anhydride, styrene, acrylonitrile, and dialkyl maleates and fumarates monomer can also be grafted to change the properties of the product.

VCHD is prepared by known processes. For example, butadiene is used to form vinyl cyclohexene which is reacted with hydrogen peroxide or peracetic acid to form an epoxide which is then hydrolyzed to VCHD. Typically, about 90% of the VCHD vinyl groups are in the equatorial position, preferably about 94%. Typically, about 95% of the OH groups of VCHD are in the equatorial position, preferably about 99%.

Vinyl Polyols Containing Vinylcyclohexanediol

Reaction of vinylcyclohexanediol (VCHD) with other vinyl monomers allows the formation of a large group of polyol intermediates. These polyols can then act as intermediates for a range of applications including coatings, sealants, and urethanes by reaction of these new polyols with conventional cross-linking agents such as isocyanates, urea-formaldehyde resins, epoxy compounds, anhydrides, organic acids (especially di, tri, and tetra acids), and even with themselves through ether forming reactions (which are well known the art).

The presence of VCHD in a vinyl polymer increases the glass transition temperature of the resin compared to other intermediates often used to impart hydroxyl functionality such as hydroxyethylacrylate (HEA), vinyl alcohol (via hydrolysis of a vinyl acetate intermediate), or hydroxypropylacrylate. VCHD also has two alcohol groups per vinyl group and thus imparts a given hydroxyl concentration at a lower level of incorporation than other hydroxyvinyl intermediates which is an economic advantage. VCHD also has the advantage of directly producing lower molecular weight polyols without the need for a chain transfer agent. Chain transfer agents, such as aliphatic thiols, are objectionable in certain applications, thus their use to produce the polyols of the present invention is optional.

Monomers which can be used with VCHD to form polyols include all of the conventional vinyl monomers such as vinyl chloride, vinylidene dichloride, ethylene, acrylonitrile, dialkyl maleates and fumarates, vinyl aromatics such as styrene, methyl styrene, or vinyl toluenes. Monomers also include acrylic or methacrylic esters, generally of the formula (I) where R=a hydrocarbon group containing 20 or fewer carbons:

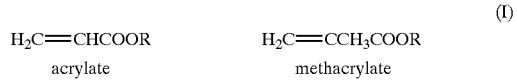

(I)

The R group can be aromatic or aliphatic in nature and can can also contain heteroatoms such as oxygen, sulfur, or phosphorous. Monomers also include acrylic and methacrylic acid, vinyl acetate, maleic anhydride, acrylonitrile, fumarate esters, maleate esters, and flouro monomers such as vinylidene difluoride or vinyl fluoride. These monomers can be used with VCHD, either individually or in combination with each other. The extent of VCHD incorporation can range from about 0.1% to about 70% by weight, preferably from about 1% to about 30%, and more preferably from about 5% to about 15%. The exact composition is a function of the particular group of physical properties desired in the final polyol.

The above monomers can also be reacted with the resin compositions of the present invention (e.g., VCHD containing polyester) to form copolymers.

The following examples are illustrative of the present invention:

EXAMPLES

Preparation of VCHD Containing Polyester

Resin syntheses were conducted in either 250 ml or 500 ml round bottom glass flasks equipped with an overhead mechanical stirrer, an inert port for nitrogen, a thermocouple, a condenser and a trap to collect the water generated during esterification. A heating mantle was fitted around the flask.

Example 1

Isophthalic Acid (31.4 g), adipic acid (27.6 g), trimethylolpropane (4.8 g), VCHD (33.85 g), neopentylglycol (24.8 g), and Fascat 4100 (65 mg) were charged to the reaction flask. The system was purged with nitrogen and the reactants stirred and heated slowly to 225° C. and maintained at that temperature. Water was observed collecting in the overhead trap when the reactants were at about 194° C. Heating was continued until water evolution ceased, which was after about 3.5 hours. A 1.5 g sample was withdrawn and an acid number of 3.9 was measured. Heating was stopped and the contents were poured into a dish lined with silicone release paper.

Example 2

Example 2 was prepared in a manner similar to Example 1 except that 67.7 g of VCHD and 130 mg of catalysts were used and no neopentyl glycol was used. A final acid number of 10.5 was achieved.

Example 3

Example 3 was prepared in a manner similar to Example 1 except that 130 mg of Fascat was used. A final acid number of 4.2 was achieved.

Control Example 1

Control Example 1 was prepared in a manner similar to Example 1 except that 49.6 g of neopentyl glycol and 130 mg of Fascat were used and no VCHD was used. A final acid number of 1.0 was achieved.

Example 4

4.98 equivalents of isophthalic acid, 1.67 equivalents of trimellitic anhydride, 4.77 equivalents of neopentyl glycol, 1.67 equivalents of adipic acid, and 4.77 equivalents of VCHD were combined with 0.05% Fascat and heated to 232° C. in a manner similar to Example 1. A final acid number of 35 was achieved. The glass transition temperature of the resin was 57° C.

Control Example 2

Control Example 2 was prepared in a manner similar to Example 4 except that 9.54 equivalents of neopentyl glycol was used and no VCHD was used. A final acid number of 37 was achieved. The glass transition temperature of the resin was 42° C.

Example 5

The following examples were prepared in a manner similar to Example 1:

| Components | Control | | 50% VCHD | | 100% VCHD |
|---|---|---|---|---|---|
| isophthalic acid | 3.53 | | 3.53 | | 3.53 |
| adipic acid | 3.53 | | 3.53 | | 3.53 |
| trimethylolpropane | 1.00 | | 1.00 | | 1.00 |
| neopentyl glycol | 8.91 | | 4.46 | | 0 |
| VCHD | 0 | | 4.46 | | 8.91 |
| Melt polymerization at 225° C.: | (i) | | (ii) | (iii) | |
| Fascat 4100, wt % | 0.1 | 0 | 0.05 | 0.1 | 0.1 |
| Reaction time (hr) | 2 | 8 | 3.5 | 2 | 4.5 |
| Properties: | | | | | |
| acid number | 1.0 | 9.6 | 5.0 | 4.2 | 10.5 |
| MW (calculated) | 730 | 712 | 755 | 763 | 754 |
| $T_g$ (° C.) | −6 | — | 4 and 24 | 5 | 25 |
| Gardner color | 1 | 1 | 2 | 2–3 | 1–2 |
| Viscosity (Gardner Holdt) 75% NVM | H | | F | | G |

(i) and (ii) above involved staged addition of diols, first VCHD, then NPG; (iii) involved simultaneous addition of diols VCHD and NPG.

The higher $T_g$ for the VCHD-containing resins in Example 5 means that the resins are harder than the control resins. The similar Gardner color for all of the above resins means that VCHD has no adverse effect on color. The lower viscosity for the VCHD containing resins will make them easier to apply as a coating.

The range of possible glass transition temperatures for the present resins is fairly large since it can be influenced by the other polyester components besides VCHD. VCHD will tend to increase $T_g$ in a specific system more than other diols.

Example 6

High Molecular Weight Poly(ethylene-co-vinylcyclohexaneterephthalate)

PET-VCHD copolymers (PEVT) were made according to standard polyester procedures. An oligomeric resin was first manufactured in an excess of ethylene glycol (EG) at 230°–280° C. This oligomer was then placed under vacuum and excess glycol removed to drive the material to high molecular weight. Conditions of specific experiments are listed in Table 1. Generally, dimethylterephthalate (DMT) was used as terephthalate source and Ca/Mn acetate as catalyst. VCHD levels from 0–20% were attempted. The specific details of experiments 148 and 149 follow:

Experiment 149: Stage 1—In a glass reaction vessel were placed 48.6 g dimethylterephthalate and 24.83 g ethylene glycol along with 8 mg of calcium acetate and 12 mg of manganese acetate. This reactor was fitted with a vigeraux column, an overhead stirrer, and a condenser and blanketed with nitrogen. The reactor was placed in a 200° C. oil bath and the temperature increased to 280° C. at a rate of 2° C./minute and then held at 280° C. for four hours. 14.2 g of methanol were distilled from the reactor and 52 g of prepolymer were produced.

Stage 2—To this prepolymer was added 3.55 g of VCHD and 8 mg of antimony trioxide. This was blanketed with nitrogen and placed in a 255° C. oil bath with a nitrogen purge to facilitate removal of excess methanol and glycol. Vacuum was gradually applied over 84 minutes until a full vacuum of 2 mm Hg was reached. The temperature was simultaneously increased to 284° C. The system was held at vacuum and high temperature for two hours. The resulting polymer had an inherent viscosity of 0.89 and a glass transition of 82° C., a melting point of 225° C., a $T_c$ on cooling of 187° C., and $T_m$-$T_c$ of 38° C. The VCHD content was approximately 10% by mole.

Control Experiment 148: PET was made under equivalent conditions as Experiment 149 and had a $T_g$ of 78° C., a melting point of 243° C., a heat of crystallization on cooling of 159, $T_m$-$T_c$ of 84° C., and an IV of 1.04.

Materials of Example 6 were characterized by inherent viscosity (IV) and differential scanning calorimetry (DSC). Data are shown in Table 2. Experiment 153 showed the effect of increasing VCHD concentration. The crystallinity of the PET was almost totally destroyed in this sample.

Several samples appeared to be PET and showed no VCHD incorporation despite the VCHD added during synthesis. It is likely that the conditions of these experiments, especially the amount of time at temperature, were too extreme and that the PEVT degraded with VCHD elimination. This would result in the transformation of PEVT to conventional PET. Another explanation could be the point of VCHD addition. In experiments 150 and 152, VCHD was added at the beginning along with a large excess of ethylene glycol. Ethylene glycol is far more reactive and VCHD would not react until the bulk of the EG was consumed. Side reactions between the EG and the VCHD could be preventing the formation of PEVT. Proper control of the reaction temperature, reaction time, and point of VCHD addition will be necessary to optimize PEVT formation. Determination of the optimal reaction temperature, reaction time, and point of VCHD addition would be a matter of routine experimentation.

The studies to date have demonstrated several things about PEVT. VCHD clearly reduced the crystallinity of PET. This makes PEVTs of little use in applications requiring crystallinity but of significant use in applications (e.g., packaging) where reduced crystallinity or amorphous structure are desirable. Synthesis of PEVT will be more difficult than conventional polyester due most likely to the large reactivity difference between the two glycols (i.e., EG and VCHD). It is likely that specific conditions of temperature and staging of diol addition (e.g., VCHD first, last or simultaneously) will be necessary to optimize the PEVT synthesis.

TABLE 1

PEVT Copolymer Synthesis

| Expt | DMT[a] | EG | VCHD | Temp I[b] | Temp II[c] | Cat 1[d] | Cat 2 | IV | $T_g$ | Comments |
|---|---|---|---|---|---|---|---|---|---|---|
| 148 | 1 | 1.6 | 0 | 280 | 288 | 8/12 | 8 | 1.09 | 79 | PET Control, no VCHD added |
| 149 | 1 | 1.6 | 0.1 | 280 | 288 | 8/12 | 8 | 0.89 | 82 | VCHD added in second stage after formation of DMT/EG prepolymer, gray polymer |
| 150 | 1 | 1.6 | 0.1 | 280 | 288 | 8/12 | 8 | 0.93 | 79 | VCHD in first stage, gray polymer[2] |
| 152 | 1 | 1.6 | 0.1 | 280 | 288 | 8/12 | 8 | 0.79 | 79 | VCHD/DMT, then EG in stage 1[f] |
| 153 | 1 | 1.6 | 0.2 | 280 | 288 | 7.5 | 8 | — | 80 | Fascat catalyst for first phase prepolymer, in first step brown polymer |
| 155 | 1 | 1.6 | 0.1 | 280 | 270 | 8/12 | 8 | 0.36 | 79 | VCHD added in first stage, 1 hour at 270° C. in stage 2 |

[a]Experimental scale was always 48 g of DMT or 0.25 mole.
[b]Ultimate temperature of stage I. Starting temperature was always 200° C. with a ramp rate of 2° C. per minute, hold time four hours.
[c]Ultimate temperature of stage II. Starting temperature was 255° C. with nitrogen purge. Vacuum increased over 90 minutes as temperature was increased to final value. Material held at full vacuum and temperature for two hours.
[d]Quantity of catalyst 1 and 2 shown in mg. Catalyst 1 was Ca/Mn acetate except for experiment 153 where Fascat was used. Catalyst 2 was antimony oxide.
[e]VCHD added with DMT and EG in first stage prepolymer synthesis. Product is PET. VCHD is lost during first stage probably due to thermal degradation, reaction with ethylene glycol, or ineffectiveness of first stage catalyst for VCHD.
[f]VCHD reacted with DMT prior to EG addition in first stage. Little reaction occurred between VCHD and DMT before EG addition. Resulted in PET for reasons equivalent to experiment 150.

TABLE 2

PEVT Thermal Data

| Expt | % VCHD | $T_g$ (° C.) | $T_m$ (° C.) | $T_c$ (° C.) | Heat of Fusion (cal/g) | Comment |
|---|---|---|---|---|---|---|
| 148 | 0 | 78 | 243 | 159 | 6.8 | |
| 149 | 10 | 82 | 225 | 187 | 1.4 | |
| 150 | 10 | 79 | 240 | 162 | 7.6 | |
| 152 | 10 | 79 | 247 | 145 | 9.9 | |
| 153 | 20 | 80 | 217 | 172 | 0.44 | First heat, broad $T_m$ and $T_c$ |
| 153 | 20 | 80 | 218 | 188 | 0.07 | Second heat, little crystallization |
| 155 | 10 | 79 | 238 | 174 | 7.3 | As expt 149 except less heat and time in final stage |

All DSC scans done at 20° C./minute. % VCHD represents amount added to polymerization not the amount actually in the polymer.

Polyester Grafted Hybrids

A series of screening experiments were completed to determine if VCHD containing polyester oligomers could be reacted with acrylic monomers typically used in coatings. These materials were then analyzed by DSC and electron microscopy to determine their thermal and morphological behavior.

Data on specific experiments are listed in Table 3. In a typical study the polyester resin was dissolved in toluene and the monomer and catalyst added. The system was heated to the reaction temperature (e.g., about 50°—about 150° C., preferably about 60°—about 152° C.) and held at this temperature for the indicated time (e.g., about 2—about 24 hours, preferably about 12—about 16 hours). This was typically overnight to ensure the complete reaction of the monomer. The polymer was then isolated and analyzed. Data on specific hybrid systems are listed in Table 4.

More specifically, for experiments 132, 138 and 142, hybrid polyester/acrylates or methacrylates were prepared by dissolving approximately 3 g of polyester resin (VCHD-containing polyester resin for experiments 132 and 138) in 15–20 ml toluene and by adding 3 g of monomer and 15 mg of benzoylperoxide. The mixture was then heated to 70° C. and held at that temperature overnight. The resulting polymer was collected and residual solvent and monomer were removed at 70° C. under vacuum. Film samples were prepared by dissolving the product in toluene and casting the product onto a Teflon surface. The solvent was allowed to slowly evaporate to form a polymeric film.

Experiment 138

A hybrid system was prepared from the polyester of Example 3 and methylmethacrylate as described above. The film, cast from the toluene solution, was surprisingly clear as shown in FIG. 1(B).

Control Experiment 142

A hybrid system was prepared from the polyester of Control Example 1 and methylmethacrylate. The film, cast from the toluene solution, was opaque and hazy as shown in FIG. 1(A).

Experiment 132

A hybrid system was prepared from the polyester of Example 3 and butyl acrylate. The resulting film was clear, similar to Experiment 138.

Polymerization of an acrylate or methacrylate monomer in the presence of VCHD containing oligomers can lead to three possible outcomes. One is that no grafting occurs and polymerization of the monomer yields a physical blend of the two polymers. In this case, the glass transition temperature of each material should be equivalent to that seen in the pure materials and a two phase morphology should be evident. Second, a small amount of grafting could occur. In this case, the glass transition temperature may be near those of the pure polymers. The morphology of the product should show a reduction in the size of the individual phases for the two polymers and possibly an interfacial zone between the two materials. Third, a more total compatibilization may occur. In this case there would be an averaging of the glass transition temperatures and a one phase morphology would result. The result appears to depend on the reactivity of the monomer used.

Figure 3:
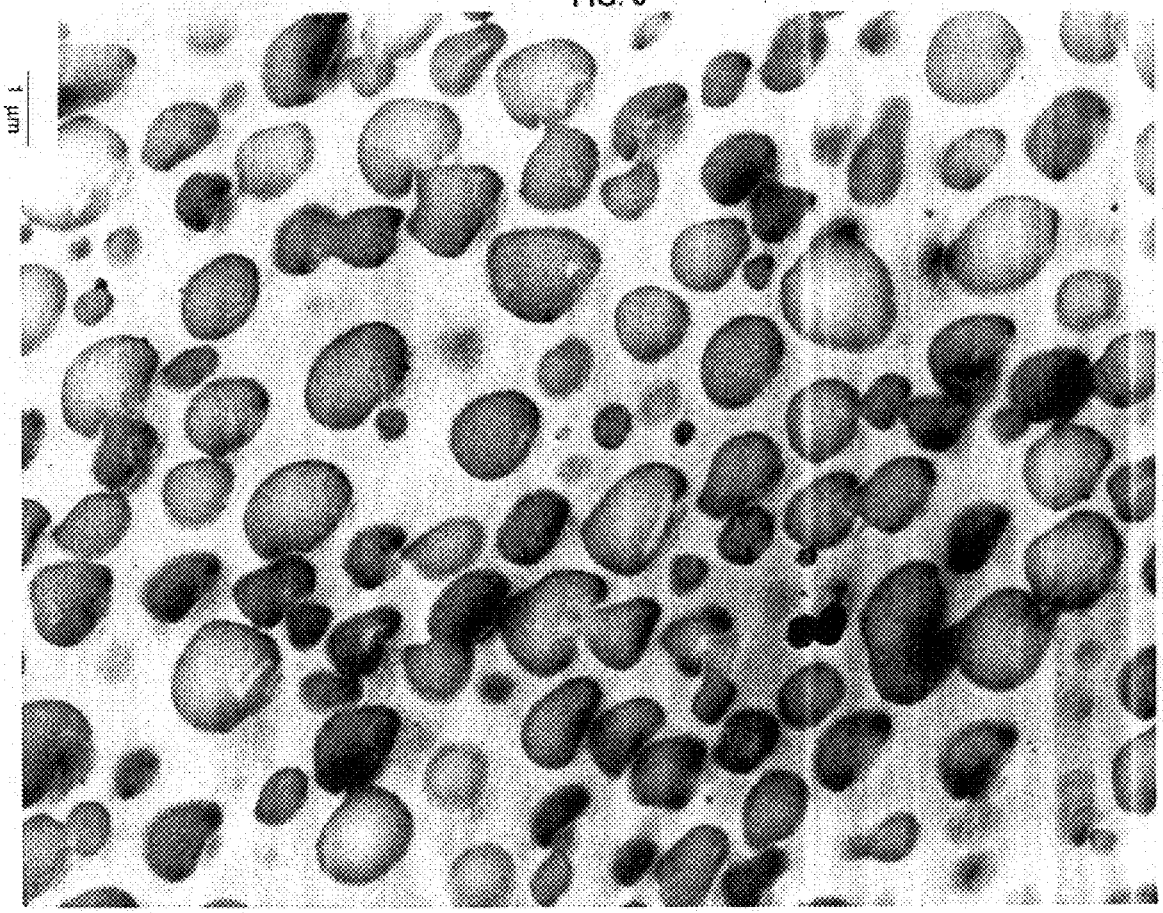
FIG. 3 represents transmission electron micrograph for experiment 142 described in Tables 3 and 4.
Figure 4:
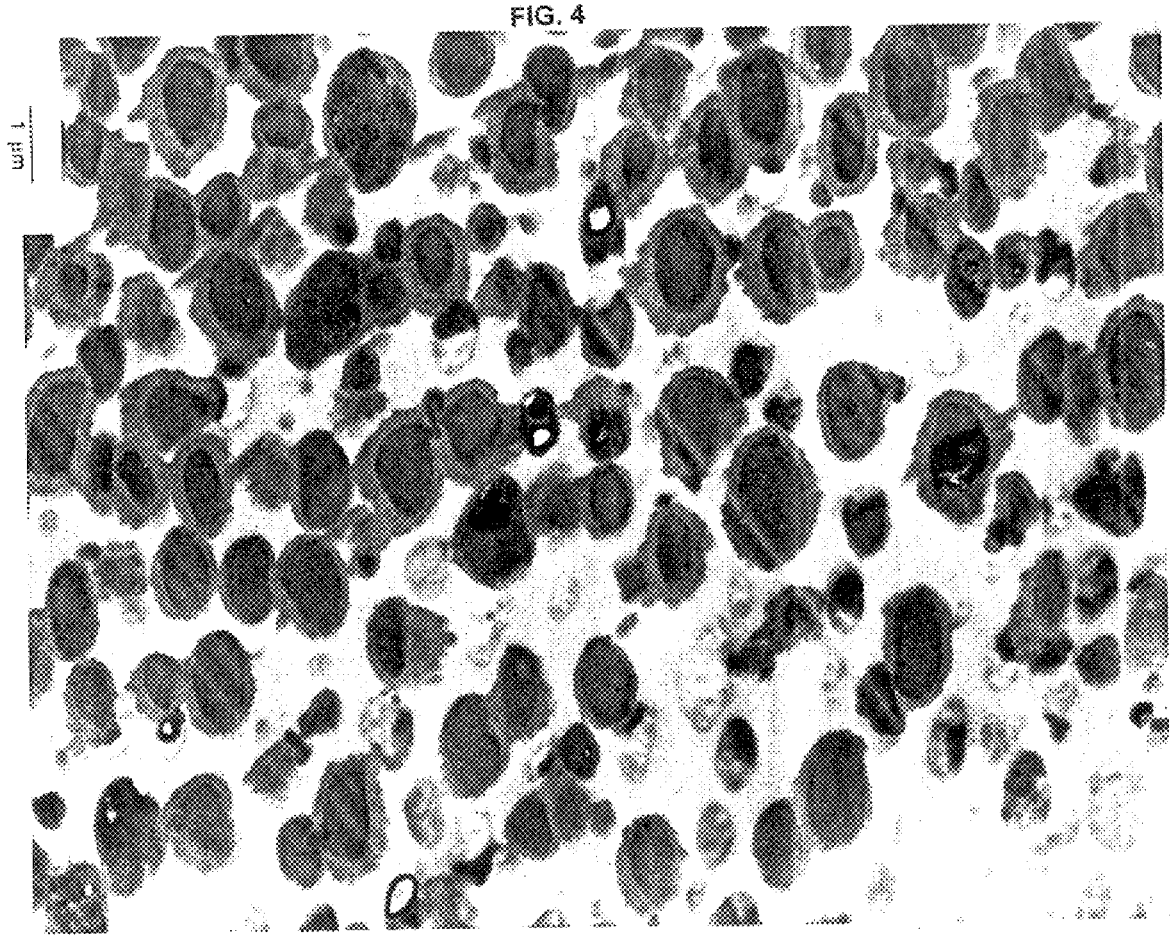
FIG. 4 represents transmission electron micrograph for experiment 138 described in Tables 3 and 4.

In cases using MMA (methylmethacrylate) as the monomer, compatibilization occurs. There seems to be a reduction in the glass transition temperature for the PMMA (polymethylmethacrylate) but two $T_g$s are clearly seen in the samples. In general, the $T_g$ of the polyester was increased by about ten degrees as compared to the pure polymer. In experiments 142 and 138 the system with the VCHD showed a larger increase in the polyester $T_g$. Interestingly, in this case the $T_g$ of the PMMA case was much lower than expected for systems with and without the VCHD. The electron microscopy of these two systems did show a major difference. Experiment 138, where the polyester contained VCHD, showed compelling evidence for phase compatibility. There were fringes around the polyester phases (FIG. 3) and fracture surfaces show cleavage through the phases but not along the phase boundaries (FIG. 2). Without the VCHD (e.g., Experiment 142), this was not observed. This is shown in FIGS. 2–4. The number of vinyl groups that have reacted was very small. NMR cannot detect a difference in the vinyl group intensity so the extent of grafting must be less than 5%.

Figure 5:
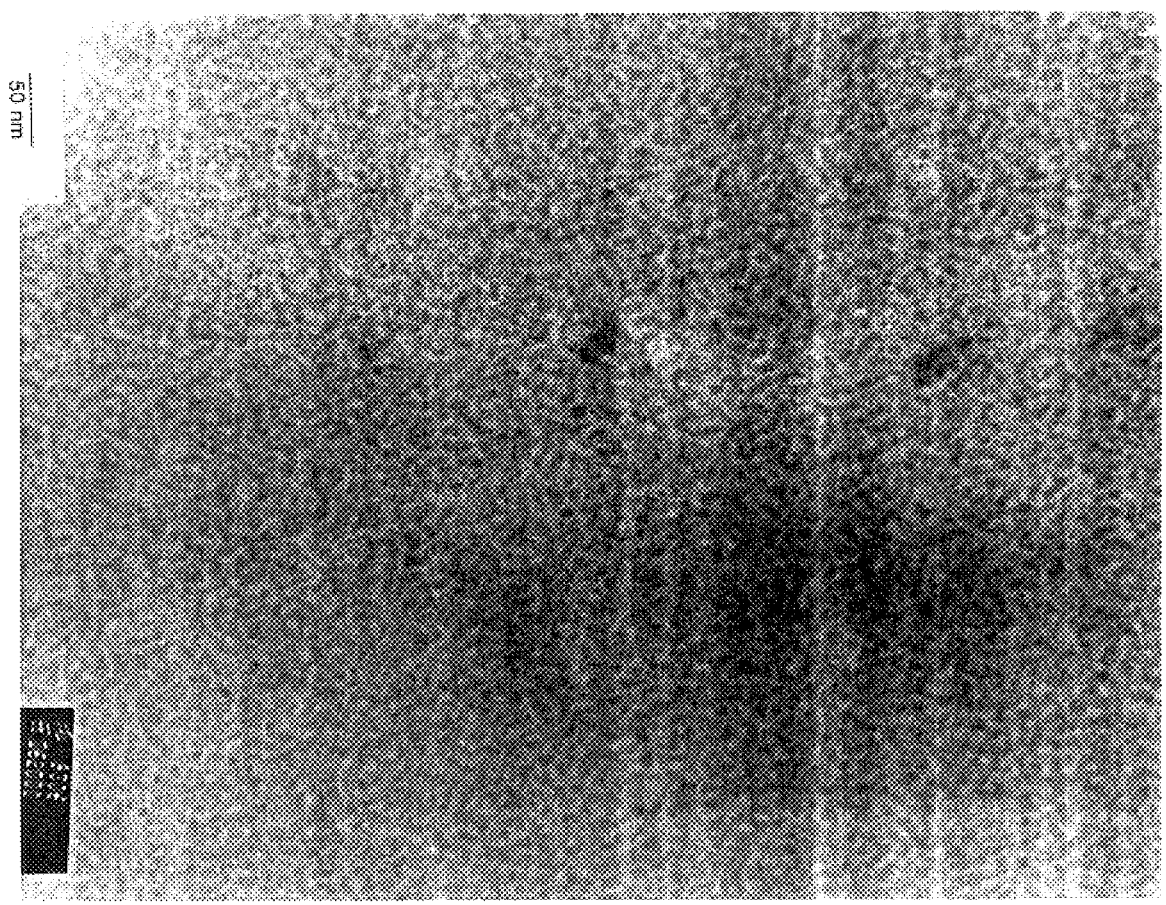
FIG. 5 represents transmission electron micrograph for experiment 146 described in Tables 3 and 4 (butyl acrylate graft hybrid of butyl acrylate and polyester 51-4).
Figure 6:
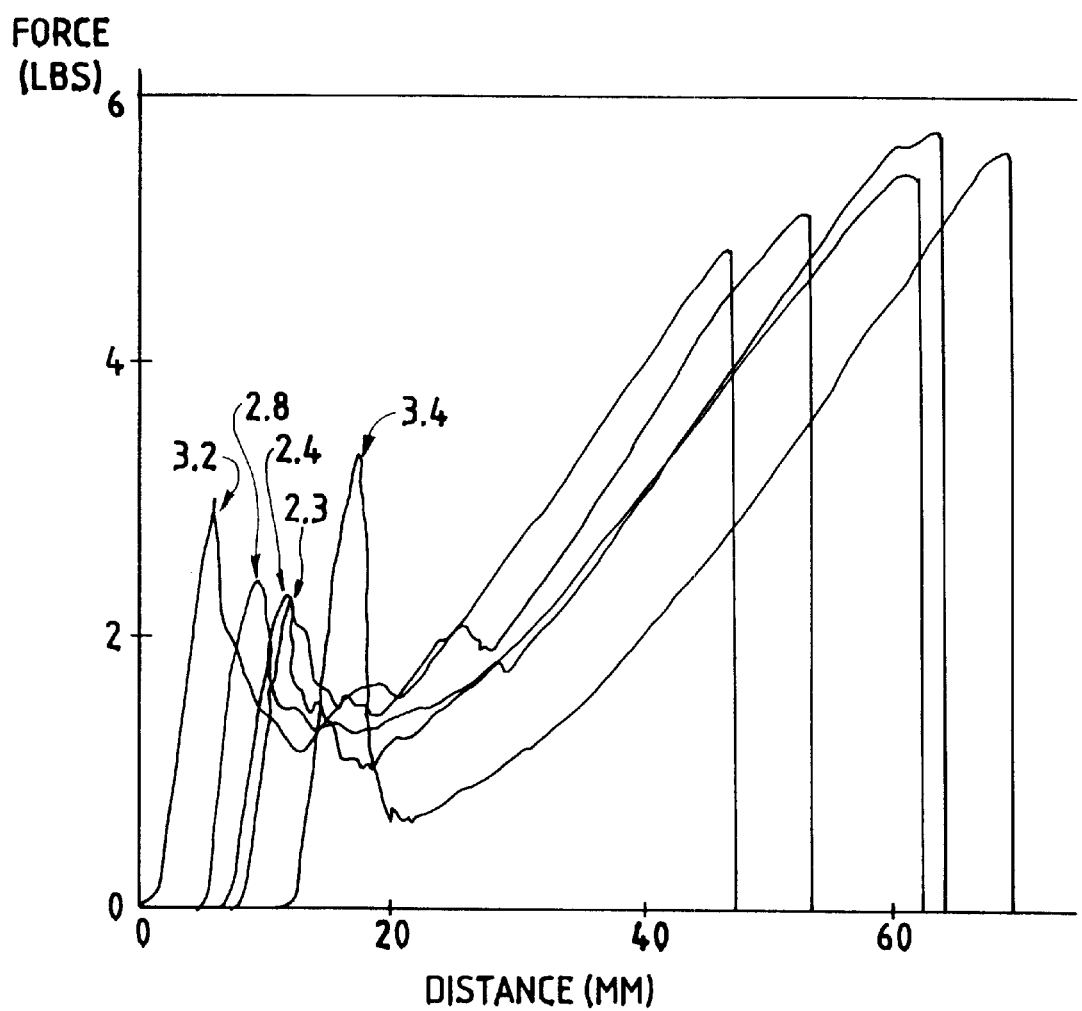
FIG. 6 represents stress-strain curves for untreated tire cord.
Figure 7:
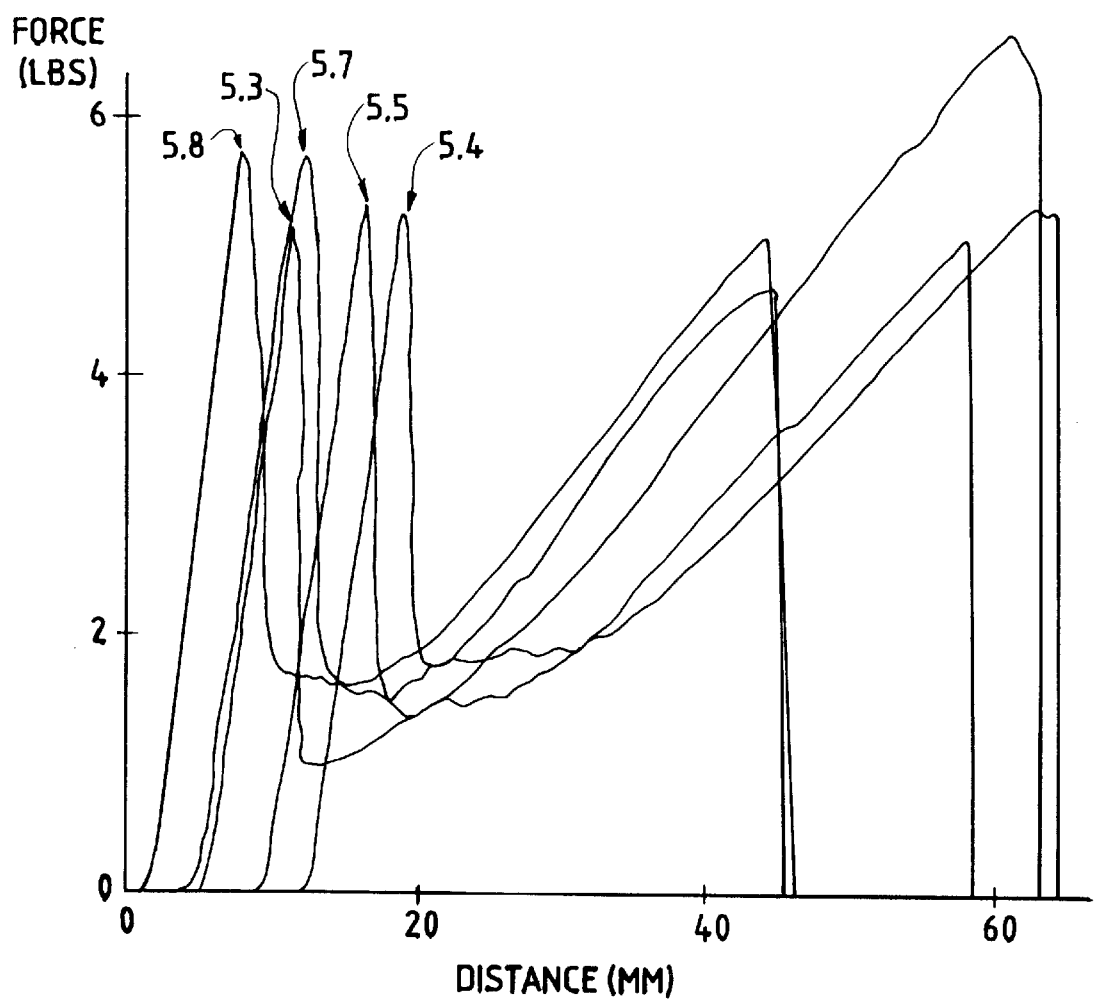
FIG. 7 represents stress-strain curves for coated tire cord.

In FIG. 5 a different morphology is observed. Instead of distinct regions of polyester and acrylate, the two materials are intimately combined. Individual phases are 10–20 nm in size and both materials appear to be co-continuous. This represents mixing at near the molecular level. This structure should yield a performance intermediate between that of the two polymers.

These two morphologies, compatibilized two phase and uniform mixed phases, represent the two extremes of useful polymer combination. By controlling the amount of VCHD in the polyester and the type of monomers used it will be possible to tailor the hybrid to have either structure and it will therefore be possible to design materials with a very wide range of performance. For example, for high impact strength, a compatibilized two phase structure is generally preferred. For the highest possible clarity, a uniform single phase is best.

In the case of butyl acrylate grafting, gels were formed with the aliphatic polyester, 19530-36. Gels indicate that some of the VCHD was reacting. With the harder polyester resin, 19530-514, gel formation was not noticed but a significant change in thermal behavior was seen. This experiment, 146, gave a material with only one $T_g$. This was at 68° C. This was lower than the $T_g$ for the polyester and far greater than the $T_g$ of polybutyl acrylate. The sample showed a unique two phase morphology. The two phases seem to be co-continuous as was observed in interpenetrating networks and the phase size was less than 100 nm. This should make the systems clear. For butyl acrylate, NMR indicates a significant percentage of vinyl groups have reacted, about 15%.

The difference in reactivity observed for butyl acrylate and methylmethacrylate must be related to their ability to react with VCHD. Since either monomer is far more likely to react with itself than with a VCHD, grafts with either monomer would be expected to contain long runs of the acrylate polymer. For methylmethacrylate, this process probably continues until all of the monomer has been exhausted and only then will there be some reaction between the radical chain end of the PMMA molecules and VCHD. Many of the PMMA chains would terminate by disproportionation and not graft at all. This would explain why there was no gel formation observed in the MMA cases and why the extent of VCHD reaction was so low.

Butyl acrylate was more reactive toward VCHD. Polyester -36 has a 30% VCHD content. When this was polymerized with butylacrylate, crosslinks formed. Obviously, there must be several VCHDs incorporated along the polybutylacrylate chain to cause this. With polyester -51-4, 14% VCHD, crosslinking was not observed. The VCHD level was lower than with the previous polymer, obviously too low for the system to crosslink. With butyl acrylate, controlling the VCHD content will be critical for giving a system which is grafted but not gelled.

Thus, VCHD can be used to compatibilize acrylates and methacrylates to common polyesters. Butyl acrylate was more reactive toward VCHD than methyl methacrylate. A significant amount of the VCHD vinyl group will remain unreacted when grafting in a conventional fashion. A range of morphologies appear possible depending on how the grafting is done. These range from compatibilized two phase systems to IPN (interpenetrate network) type structures with very fine co-continuous domains. These later structures should give good performance since they could combine unique performance features of both polyesters and polyacrylates.

TABLE 3

Polyester Hybrid Experiments

| Expt | Polyester | VCHD (mole %) | Monomer | Polyester Monomer Ratio | Rxn Temp (C.) | Benzyol Peroxide (mg) | Polymer (g) | Monomer (g) | Toluene (ml) | Reaction Time (hrs) | Comment |
|---|---|---|---|---|---|---|---|---|---|---|---|
| 131 | 19530-36 | 30.5 | BA | 1:1 | 60 | 16 | 3 | 3 | 15 | 16 | Devol'd at 100° C., Formed gels |
| 132 | " | " | " | " | 70 | 17 | " | " | " | 16 | Devol'd at 70° C., No gels |
| 133 | " | " | — | — | 70 | 17 | " | — | " | 22 | Dried at 100° C., No gels |

TABLE 3-continued

Polyester Hybrid Experiments

| Expt | Polyester | VCHD (mole %) | Monomer | Polyester Monomer Ratio | Rxn Temp (C.) | Benzyol Peroxide (mg) | Polymer (g) | Monomer (g) | Toluene (ml) | Reaction Time (hrs) | Comment |
|------|-----------|---------------|---------|------------------------|---------------|----------------------|-------------|-------------|--------------|---------------------|---------|
| 134 | " | " | " | " | 62 | " | " | " | " | 18 | Devol'd at 70° and 100° C., Formed Gels |
| 138 | " | " | MMA | 1:1 | 64 | " | " | " | " | 16 | Devol'd at 70° C., No Gels |
| 139 | " | " | Styrene | 1:1 | 63 | 18 | " | " | " | " | Styrene didn't polymerize |
| 142 | -41 | 0 | MMA | 1:1 | 70 | 15 | 3.3 | 3.3 | " | 15.5 | Control Experiment, MMA, No VCHD |
| 143 | -41 | " | BA | 1:1 | 70 | 15 | 3.0 | 3.0 | 15 | 15.5 | Control Experiment, BA, No VCHD, No Gels |
| 145 | -51-4 | 15.8 | MMA | 1:1 | 72 | 150 | 30 | 30 | 150 | 16 | Precipitate polymer in methanol, dry 100° C. |
| 146 | -51-4 | " | BA | 2:1 | 73 | 150 | 40 | 20 | 150 | 16 | |
| 147 | -51-4 | " | MMA | 1:2 | 65 | 150 | 20 | 40 | 150 | 16 | Forms hazy solution, precipitate as above |

Polyester 19530-36: Isothalic acid - 20.4, Adipic Acid - 20.0, Trimethanolpropane - 3.8, VCHD, 30.5, Neopentylglycol - 25.6 (mole %)
Polyester 19530-54-4: Terethalic acid - 43, NPG - 39.4, VCHD - 15.8, TMA - 1 .5 (mole %)
Polyester 19530-141: Isothalic acid - 19, Adipic Acid - 19, Trimethanolpropane - 3.8, Neopentytglycol (NPG) - 48 (mole %)

TABLE 4

Properties of Hybrid Resins

| Expt | Polyester | Monomer | Polyester Monomer Ratio | $T_g$ | % VCHD Reacted by NMR[1] | TEM Morphology | SEM Fracture Surface | Comment |
|------|-----------|---------|------------------------|-------|--------------------------|----------------|----------------------|---------|
| 138 | -36 | MMA | 1:1 | 14,67 | na | Two major phase with an interface between materials, PMMA matrix, 1 u PE spheres | No breakage at phase boundary, cleavage through spherical phase | Compatibilized two phase behavior, PE $T_g$ increased, PMMA $T_g$ reduced |
| 142 | -41 | MMA | 1:1 | -5.6,59 | na | Two phase, no phase fringes indicates no interfacial adhesion, PMMA matrix, 1.8 × 1 PE ovoid | Massive failure at phase boundary, classic crater fracture surface | PMMA $T_g$ is too low indicating experimental problem or compatibility without VCHD. PET $T_g$ increased |
| 145 | -51-4 | MMA | 1:1 | 84,121 | <5% | Not analyzed | Not analyzed | PET $T_g$ increased, PMMA $T_g$ is normal |
| 146 | -51-4 | BA | 2:1 | 68 | 10–20% | Two phase but extremely fine morphology with phase size below 100 nm. Appears to be interconnected two phase morphology. | Not analyzed | Does not agree with Fox equation for compatible system. Probably another broad $T_g$ for PA phase. PBA may be matrix. |
| 147 | -51-4 | MMA | 1:2 | 82,112 | <5% | Not analyzed | Not analyzed | |
| | -36 | — | — | 1 | — | Not analyzed | Not analyzed | |
| | -41 | — | — | -13 | — | Not analyzed | Not analyzed | |
| | -51-4 | — | — | 74 | — | Not analyzed | Not analyzed | |
| Lit. | — | MMA | — | 105 | — | Not analyzed | Not analyzed | |
| Lit. | — | BA | — | -53 | — | Not analyzed | Not analyzed | |

Lit. = Literature values from the Polymer Handbook
[1] % VCHD Reacted was determined by proton NMR. % Resin composition was determined from characteristic peaks in the spectrum. The amount of VCHD reacted was determined by comparison of product to starting polyester. In cases using MMA, there was no detectable change in VCHD olefin peak so the grafting level is assumed to be something under 5%, approximately the accuracy of the experiment.

The discussion above, directed to polyesters, is fully applicable to VCHD containing alkyd resins.

A further series of acrylation experiments were conducted. The first stage was a polyesterification which includes incorporation of VCHD. The second stage was free radical polymerization of the first stage material in the presence of butyl acrylate or methyl methacrylate. Below are recipes for (1) the VCHD modified polyester, (2) the different ratios of acrylates used to acrylate the polyester, (3) the VCHD modified alkyd, and (4) the different ratios of acrylates used to acrylate the alkyd.

VCHD Modified Polyester

Preparation of First Stage of VCHD Modified Polyester. All ingredients were charged to a keftle equipped with a receiver, steam heated partial condenser, total condenser, agitator, thermometer and inert gas sparge. The mixture was slowly heated until it could be agitated. Heating was continued to 232° C. while maintaining an overhead temperature of 100° C. The mixture was processed until an acid number of 10 was achieved. The resin was cooled to 104° C. and thinned to 80% NVM with n-butyl acetate.

| Resin Formulation and Properties for VCHD Modified Polyester (sample HS-560) | |
|---|---|
| | 50% VCHD |
| Number | 19682-8 |
| Neopentyl Glycol | 247.9 g |
| Trimethylol Propane | 47.9 g |
| VCHD | 338.4 g |
| Isophthalic Acid | 313.8 g |
| Adipic Acid | 275.9 g |
| TOTAL | 1224 g |
| less water | 130 |
| YIELD | 1196 |
| Acid Number, mg KOH/g | 15.9 |
| Hydroxyl Number mg KOH/g | 167.1 |
| Viscosity Gardner-Holdt | Y+ |
| Non-volatile Material (NVM), wt % | 80.1 |
| Color, Gardner | <2 |
| Volatiles | n-Butyl Acetate |
| APHA | 99.2 |
| Molecular Weight, Mn | 796 (988) |
| $T_g$ | −5 |
| Total Cook Time | N/A |

Preparation of Second Stage Polyester Acrylation 20 weight % of the above VCHD modified polyester was added to a reaction kettle and heated under an inert gas sparge to 94° C. 1 weight % tertiary butyl peroxide was added to this pre-polymer, followed by a dropwise addition of a blend of 37 and 43 weight % of butyl acrylate and methyl methacrylate respectively. The resin was allowed to process for one hour.

| Acrylation Recipe | |
|---|---|
| Sample | A124 Weight % |
| VCHD Resin | 20 |
| Butyl Acrylate | 37 |
| Methyl Methacrylate | 43 |
| Observations | Liquid Polymer |

Preparation of First Stage of VCHD Modified Alkyd

Fatty acids, trimethyolpropane, VCHD and neopentyl glycol were charged to a reactor equipped with a receiver, steam heated partial condenser, total condenser, agitator, thermometer and inert gas sparge. The mixture was slowly heated until it could be agitated. Purified isothalic acid (PIA) was added to the slurry of reactants. Heating was continued over a 2–3 hour period to 238° C. while maintaining an overhead temperature of 100° C. The mixture was processed until an acid number below 10 was achieved. The resin was cooled to 171° C., then trimellitic anhydride (TMA) added and the reactor vented. The resin was held at 171–177° C. for a 46–50 acid number and then cooled to 130° C. Butyl acetate was added to achieve a 80% NVM.

| Resin Formulation and Properties (sample HS-560) | |
|---|---|
| | 50% VCHD WB-151 |
| Number | 19682-8 |
| Neopentyl Glycol | 86.60 |
| Trimethylol Propane | 304.20 |
| VCHD | 118.20 |
| Isophthalic Acid | 460.8 |
| Trimellitic Anhydride | 152.55 |
| Linoleic Acid | 550.20 |
| TOTAL | 1672.55 |
| less water | −140 |
| YIELD | 1533 |
| Acid Number, mg KOH/g | 46.3 |
| Hydroxyl Number mg KOH/g | Not able to determine |
| Molecular Weight, Mn | 2255 |
| Total Cook Time | 9.75 hrs. |

Preparation of Second Stage Alkyd Acrylation 90 g of VCHD modified alkyd was added to a three neck reaction flask and bubbled with nitrogen for 20 minutes. The pre-polymer was heated to 94° C. for 5–10 minutes under an inert gas sparge. 3 grams of tertiary butyl peroxide was added to this pre-polymer, and a mixture of 90 g of butyl acrylate and 108 grams of methyl methacylate was added dropwise over half an hour period. Thereafter a second charge of initiator was added and the contents were held for 60 minutes.

| Acrylation Recipe | |
|---|---|
| Sample | A124 Weight % |
| VCHD Resin | 20 |
| Butyl Acrylate | 37 |
| Methyl Methacrylate | 43 |
| Observations | Liquid Polymer |

| Acrylated VCHD-Modified Polyester | |
|---|---|
| Sample 19717-140 RAW MATERIALS: | |
| VCHD Polyester (50% modified HS560) | 96 g |
| Butyl Acrylate | 96 |
| Methyl Methacrylate | 108 g |
| 1-dodecanethiol | 0.52 g |
| t-butyl peroxide | 3.01 g |

Step A

In a beaker, butyl acrylate(90 g), methyl methacrylate(108 g) and dodecanethiol(0.52 g) were mixed.

Step B

Under inert atmosphere, 90 g of VCHD polyester were added into a 3-necked flask and heated to 200° F. Then 3.01 g initiator followed by slow addition (over 30 mins) of mixture in Step A. The reaction mixture was held at 200° F. for another 45 mins.

Sample 19717-138

Same procedure as above, except level of 1-dodecanethiol was lowered to 0.26 g.

Resin and Coating Evaluations

| High Solids Polyester Resin | Control | VCHD Modified |
|---|---|---|
|  | parts by weight | |
| Resin Formulation: | | |
| Neopentyl glycol | 496 | 248 |
| VCHD |  | 338 |
| Trimethylolpropane | 48 | 48 |
| Isophthalic acid | 314 | 314 |
| Adipic acid | 276 | 276 |
| Resin Properties: | | |
| Acid number | 9.7 | 9.5 |
| Hydroxyl number | 180.8 | 188.9 |
| Viscosity, Garner-Holdt | W+ | YZ |
| Non-volatile material, wt % | 79.9 | 77.2 |
| Color, Gardner | 1 | <2 |
| APHA | 63.8 | 159.3 |
| Molecular weight, Mn | 1005 | 953 |
| $T_g$, °C. | −14 | −5 |

High Solids Polyester Resin Melamine-Formaldehyde Coating Formulation

| Coating Composition: | Control | VCHD Modified |
|---|---|---|
|  | parts by weight | |
| High solids resin, 80% NVM | 274.2 | 274.2 |
| Titanium dioxide | 282.0 | 282.0 |
| Melamine crosslinker | 94.0 | 94.0 |
| Flow agent (FC430, 3M) | 3.0 | 3.0 |
| Let down solvent blend | 145.6 | 161.1 |
| (1:1 methyl amyl ketone/n-butyl acetate) | | |
| Pigment/binder ratio | 0.9/1.0 | 0.9/1.0 |
| ($TiO_2$/high solids resin) | | |
| Resin/melamine ratio | 70/30 | 70/30 |
| Viscosity, #4 Ford cup, sec | 30 | 32 |

| Coating Properties: | Control | VCHD Modified |
|---|---|---|
| Viscosity, #4 Ford cup, sec | 30 | 32 |
| Treated Cold Rolled Steel | | |
| Dry film thickness, mils | 1.5 | 1.5 |
| Pencil hardness | 3H | H |
| Sward hardness | 44 | 62 |
| Conical bend, % pass | 100 | 100 |
| Crosshatch adhesion, % pass | 100 | 100 |
| Impact resistance (in-lbs) | | |
| direct | 100 | 140 |
| reverse | 80 | 140 |
| Treated Aluminum | | |
| 20 Gloss | 84.2 | 87.1 |
| 60 Gloss | 92.3 | 94.2 |
| Pencil hardness | 2H | HB |
| Sward hardness | 44 | 66 |
| T-bend | pass 3T | pass 3T |
| Crosshatch adhesion, % pass | 100 | 100 |
| Detergent 1.25% Tide at 75° C., 168 hrs | | |
| initial 20 gloss | 84.2 | 87.1 |
| final 20 gloss | 2.4 | 8.7 |
| initial 60 gloss | 92.3 | 94.3 |
| final 60 gloss | 7.3 | 30.2 |
| initial YI | −0.54 | −0.43 |
| final YI | 5.33 | 3.19 |

| Coating Properties: | Control | VCHD Modified |
|---|---|---|
| Treated Aluminum | | |
| Humidity (240 hr) | | |
| initial 20 gloss | 86.2 | 88.3 |
| final 20 gloss | 83.7 | 74.5 |
| initial 60 gloss | 92.9 | 90.9 |
| final 60 gloss | 90.5 | 87.3 |
| YI | no change | no change |
| Final appearance | no blisters | no blisters |
| Bonderite B-37 Substrate | | |
| Salt Spray (240 hr) | | |
| adhesion, in. | 1/16 | 1/16 |
| rust creep, in. | 1/16 | 1/16 |
| 60 gloss | no loss | no loss |
| final appearance | no blisters | no blisters |
| Treated Aluminum | | |
| Stain Tests | | |
| Lipstick | 9 | 10 |
| Mustard | 4 | 5 |
| iodine | 4 | 10 |
| ink | 10 | 10 |
| grease | 10 | 10 |
| ketchup | 10 | 10 |
| bleach | 10 | 10 |
| Double MEK rubs, no. passed | >100 | >100 |

High Solids Polyester Resin Isocyanate Coating Formulation

| Coating Composition: | Control | VCHD Modified |
|---|---|---|
|  | parts by weight | |
| Component 1: | | |
| Polyester resin | 296.9 | 296.9 |
| Titanium dioxide | 324.2 | 324.2 |
| Solvent blend | 146.6 | 195.0 |
| (1:1 methyl amyl ketone/n-butyl acetate) | | |
| Flow agent (FC-430) | 1.6 | 1.6 |
| Catalyst (Fascat 4202) | 0.4 | 0.4 |
| Viscosity, #4 Ford cup, sec | 22 | 22 |
| Component 2: | | |
| Isocyanate (Desmodur N-3390) | 113 | 127.2 |
| Formulation viscosity, #4 Ford cup, sec | 42 | 32 |

| Coating Properties: | Control | VCHD Modified |
|---|---|---|
| Viscosity, #4 Ford cup, sec | 42 | 32 |
| Treated Cold Rolled Steel | | |
| Dry film thickness, mils | 1.2 | 1.2 |
| Pencil hardness | 3H | 3H |
| Sward hardness | 56 | 74 |
| Conical bend, % pass | 100 | 100 |
| Crosshatch adhesion, % pass | 100 | 100 |
| Impact resistance (in-lbs) | | |
| direct | >300 | 200 |
| reverse | 140 | 80 |
| Treated Aluminum | | |
| 20 gloss | 81.9 | 77.9 |
| 60 gloss | 92.5 | 90.7 |
| Pencil hardness | H | H |
| Sward hardness | 56 | 68 |
| T-bend | pass 1T | pass 4T |
| Crosshatch adhesion, % pass | 98 | 100 |
| Detergent, 1.25% Tide at 75° C., 168 hrs: all panels failed within 24 hrs | | |
| Treated Aluminum | | |

Resin and Coating Evaluations

| Humidity (240 hr) | | |
|---|---|---|
| Initial 20 gloss | 81.9 | 77.9 |
| final 20 gloss | 78.7 | 78.8 |
| initial 60 gloss | 92.5 | 90.7 |
| final 60 gloss | 91.3 | 89.6 |
| YI | no change | no change |
| final appearance | no blisters | no blisters |
| Bonderite B-37 Substrate | | |
| Salt Spray (240 hr) | | |
| Adhesion, in. | 1/16 | 1/16 |
| rust creep, in. | 1/8 | 1/8 |
| 60 gloss | no loss | no loss |
| final appearance | no blisters | no blisters |
| Treated Aluminum | | |
| Stain Tests | | |
| lipstick | 10 | 10 |
| mustard | 4 | 6 |
| iodine | 6 | 8 |
| ink | 10 | 10 |
| grease | 10 | 10 |
| ketchup | — | — |
| bleach | 10 | 10 |
| Double MEK rubs, no. pass | >100 | >100 |

High Solids Polyester Resin
Melamine-Formaldehyde and Isocyanate Coating Formulations

| Coating Properties | Melamine Formaldehyde | | Isocyanate | |
|---|---|---|---|---|
| | Control | With VCHD | Control | With VCHD |
| QUV-A (340 nm) | | | | |
| 400 hr, % 20 gloss retention | 90 | 91 | 100 | 92 |
| 400 hr, % 60 gloss retention | 98 | 99 | 100 | 96 |
| dYI, 400 hr | 1.16 | 5.55 | 0.52 | 5.83 |
| QUV-B (313 nm) | | | | |
| 450 hr, % 20 gloss retention | 26 | 18 | 38 | 30 |
| 450 hr, % 60 gloss retention | 66 | 56 | 73 | 72 |
| dYI, 450 hr | 2.02 | 5.19 | 1.07 | 5.26 |

High Solids Polyester Resin

The above resin property data shows that substituting 50% of NPG with VCHD in a high solids polyester resin formulation significantly raises the $T_g$ of the resin. The coatings property data shows that substitution of VCHD for NPG increases the hardness of the coating and improves resistance to certain stains (iodine and mustard). Impact resistance is slightly increased for a one part melamine cured system and slightly decreased for a two-component isocyanate cured system when NPG is replaced with VCHD. The viscosity of the freshly mixed two component high solids coating is significantly lower for the polyester resin containing VCHD than the control containing only NPG. This could result in better sprayability and higher solids coatings. Properties such as resistance to salt spray, humidity resistance, detergent resistance, adhesion, and gloss are generally unaffected when VCHD replaces NPG in this particular resin formulation. Resistance to UV radiation is significantly decreased when VCHD is present in the resin.

Waterborne Air Dry Alkyd Resin

| | Control | VCHD Modified |
|---|---|---|
| | parts by weight | |
| Resin Formulation: | | |
| Linoleic acids | 366.8 | 366.8 |
| Trimethylolpropane | 202.8 | 202.8 |
| Neopentyl glycol | 115.5 | 57.8 |
| VCHD | | 78.9 |
| Isophthalic acid | 307.2 | 307.2 |
| Tritmellitic anhydride | 101.7 | 101.7 |
| Resin Properties: | | |
| Acid Number | 46.0 | 46.4 |
| Molecular weight, Mn | 2396 | 2259 |
| Molecular weight, $M_w$ | 29,294 | 51,512 |
| $M_w/M_n$ | 12.2 | 22.8 |
| Cure time at 200° C., sec | 20 | 19 |
| Viscosity, Gardner-Holdt | Z5– | Z5 |
| Color, Gardner | 4 | 4 |
| Non-volatile material, wt % | 75.13 | 75.23 |

Volatiles: 40 parts ethylene glycol monobutyl ether plus 60 parts secbutanol

Processing Procedure

All components except TMA melt polymerized at 235–240° C. to an acid number <10, contents then cooled to 170–177° C. and TMA added and processed to an acid number 46-48. Solvent added as the system cooled.

| | Control | VCHD Modified |
|---|---|---|
| Waterborne Air Dry Alkyd Coating | | |
| Coating Properties: | | |
| pH | 8.2 | 8.2 |
| Viscosity, #4 Zahn cup, sec. | 15 | 16 |
| Viscosity, Brookfield, cp | 256 | 258 |
| Non-volatile material, wt % | 42.3 | 38.3 |
| Weight lbs/gal | 9.88 | 9.67 |
| Dry times (21° C., 31% relative humidity) | | |
| Set to touch (min) | 6 | 7 |
| 300 g, tack free (min) | 35 | 35 |
| Dry hard (hr) | 3.5 | 3.5 |
| Dry through (hr) | 8–23 | 8–23 |
| Early Water Resistance | | |
| 2 Hour Air Dry | | |
| gloss loss | no | no |
| softening | yes | yes |
| left a ring | yes | yes |
| film dissolved to metal | no | no |
| whitening | no | no |
| 24 Hour Air Dry | | |
| gloss loss | no | no |
| softening | no | no |
| left a ring | no | no |
| film dissolved to metal | no | no |
| whitening | no | no |
| Substrate: cold rolled steel | | |
| Coating Properties | | |
| 24 Hour Air Dry | | |
| film thickness (mils) | 0.8–0.9 | 0.6–0.9 |

| -continued | | |
|---|---|---|
| | Control | VCHD Modified |
| gloss (%) | | |
| 20 | 66 | 67 |
| 60 | 86 | 88 |
| yellowing index | −1.78 | −3.62 |
| pencil hardness (no cut) | 4B | 4B |
| crosshatch adhesion | 4B | 3B |
| conical bend (% pass) | 100 | 100 |
| impact resistance (in-lbs) | | |
| direct | 45 | 30 |
| reverse | <10 | <10 |
| 7 Days Air Dry | | |
| film thickness (mils) | 0.8–0.9 | 0.6–0.8 |
| pencil hardness (no cut) | HB | HB |
| crosshatch adhesion | 4–5B | 4–5B |
| conical bend (% pass) | 100 | 100 |
| impact resistance (in-lbs) | | |
| direct | 25 | 20 |
| reverse | <10 | <10 |

Waterborne Air Dry Alkyd Coating

The above data shows that viscosity, dry times, early water resistance, gloss, hardness, adhesion, flexibility, and impact resistance are generally uneffected by replacing some NPG with VCHD in this particular formulation. Substituting VCHD for NPG produces a resin with a comparable $M_n$, significantly higher $M_w$, and no increase in solution viscosity.

| Powder Polyester Resin | | | | |
|---|---|---|---|---|
| | Formula 1 | | Formula 2 | |
| | Control | With VCHD | Control | With VCHD |
| | parts by weight | | | |
| Resin Formulation: | | | | |
| 1st Stage | | | | |
| Neopentyl glycol | 430 | 310 | 345 | 229 |
| VCHD | | 141 | | 140 |
| 1,6-Hexanediol | | | 92 | 88.5 |
| Isophthalic acid | 588 | 565 | 583 | 559 |
| Trimellitic anhydride | 24.5 | 23.5 | 24.5 | 23.5 |
| 2nd Stage | 96.5 | 94 | 97 | 93 |
| Isophthalic acid | | | | |
| Resin Properties: | | | | |
| Acid number | 39.2 | 43.5 | 37.1 | 44.1 |
| Viscosity, ICI at 200° C. | 16 | 20.5 | 11 | 18 |
| $T_g$, ° C. | 62.5 | 74.6 | 50.0 | 63.0 |
| Molecular weight | 3060 | 2904 | 3403 | 3288 |
| Color | sl. yellow | amber | sl. yellow | amber |
| Clarify | clear | clear | clear | clear |

The above data shows that substituting VCHD for NPG produces a resin with significantly higher $T_g$. The VCHD resin is also more yellow.

| VCHD Radical Polymerization Results | | | | | | |
|---|---|---|---|---|---|---|
| | Methly Acrylate (MA) | | Butyl Acrylate | | Methyl Methacrylate | |
| | Acrylate Yield (%) | Mol. Weight (Mn) | (BA) | | (MMA) | |
| VCHD:M | | | Acrylate Yield (%) | Mol. Weight (Mn) | Acrylate Yield (%) | Mol. Weight (Mn) |
| 0:100 | 87 | — | 74 | 15,000 | 22 | 26,000 |
| 25:75 | 25 | — | 38 | 7,000 | 38 | 12,000 |
| 50:50 | 25 | — | 29 | 3,700 | 29 | 5,700 |
| 75:25 | 40 | — | 32 | 1,700 | 23 | — |

| VCHD Radical Polymerization Copolymer Compositions | | | | |
|---|---|---|---|---|
| Reactant Ratio | | VCHD Percentage in Polymer (Mole %) | | |
| (Weight %) | | Methyl | Butyl | Methyl |
| VCHD | M | Acrylate | Acrylate | Methacrylate |
| 25 | 75 | 8 | 7 | 1 |
| 50 | 50 | 11 | 17 | 3.5 |
| 75 | 25 | 16 | 35 | — |

The above data on VCHD Radical Polymerization shows that acrylates and methacrylates copolymerize with VCHD, acrylates are more reactive than methacrylates, VCHD is a chain transfer/ termination agent, and that acrylic polymer molecular weight and yield are reduced The above data on VCHD Polyester/ Acrylic Hybrids shows that acrylic grafting to VCHD modified polyester was achieved, compatibilized 2-phase morphology demonstrated, homogeneous 1-phase morphology demonstrated, and that morphology related to extent of grafting and monomer choice.

| Coatings Results for Acrylated VCHD Modified HS-560 Resin: Acrylated HS-560V (19717-138) | | |
|---|---|---|
| Composition: | | |
| HS-560v Polyester | 31 | |
| Butyl Acrylate (%) | 33 | |
| Methylmethacrylate | 37 | |
| 1-Decanethiol | 1% | |
| t-Bu Peroxide | 1% | |
| Hydroxyl Number | 43.7 mg KOH/g | |
| VCHD Reacted | 15% | |
| NUM | 70 | |
| Formulation: | | |
| Solvent | 50 parts | |
| Acrylated HS-560v | 100 parts | |
| Cymel 303 | 10 parts | |
| NUM | 50 | |
| Cure: 20 minutes at 175° C. | | |
| Coating Performance: | | |
| Test | Result | Comment |
| Adhesion | 100% | |
| MEK Rub | >100 | some loss of gloss |
| Conical Bend | 100% | |
| Pencil Hardness | 2H | |
| Impact Strength (in-lbs) | | |
| Direct | 160 | Haziness |

| | | observed over 40, no cracks to 160 |
| --- | --- | --- |
| Indirect | 160 | Haziness observed over 40, no cracks to 160 |
| Film Thickness | 0.5 mil | |
| Clarity | Excellent | |
| General Appearance | Excellent | |
| Detergent Resistance | >48 hours | |
| QUV-A | >48 hours | |

Coatings Results for Acrylated VCHD Modified HS-560 Resin: Acrylated HS-560V (19717-138)

Vinyl Polyol Examples

General Procedure

Vinyl polyols containing VCHD can be prepared according to traditional methods used for synthesis of vinyl polyols. VCHD and monomer were combined in 40 ml solvent (e.g., toluene). A free radical initiator, typically 40 mg benzyl peroxide, was added and the mixture heated to 85° C. for one hour. The resulting polymer was quenched and then isolated, either by percipitation into cold methanol, filtration, and drying, or isolated from solution after removing residual monomer, redissolving in dichloromethane, washing 4×with equal parts water, removing solvent, and drying.

19110-158: Prepared in a manner similar to that above, with 10 g VCHD and 10 g methylmethacrylate. Isolated by percipitation, yield 1.6 g 19110-164-1: Prepared in a manner similar to that above with 15 g VCHD and 5 g butylacrylate. Isolated from solution, yield 1.6 g.

19110-165-1: Prepared in a manner similar to that above with 10 g VCHD and 10 g butylacrylate. Isolated from solution, yield 2.9 g.

19110-165-2: Prepared in a manner similar to that above with 5 g VCHD and 15 g butylacrylate. Isolated from solution, yield 5.8 g.

19110-161-1: Prepared in a manner similar to that above with 15 g methylmethacrylate and 5 g VCHD. Isolated by percipitation. Yield 3.3 g.

19110-168-1: Prepared in a manner similar to that above with 5 g VCHD and 15 g methylacrylate. Isolated from solution, yield 5.7 g.

19110-167-2: Prepared in a manner similar to that above with 15 g VCHD and 5 g methylacrylate. Isolated from solution, yield 1.0 g.

19110-167-1: Prepared in a manner similar to that above with 10 g VCHD and 10 g methylacrylate. Isolated from solution, yield 2.5 g.

19110-160-2: Methylmethacrylate (MMA) Control Experiment.
Prepared in a manner similar to that above except using 20 g MMA. Isolated by percipitation, yield 4.4 g.

19110-160-3: Butylacrylate (BA)Control Experiment. Prepared in a manner similar to that above using 20 g BA. Isolated from solution, yield 14.8 g.

19110-167-3: Methylacrylate control: Prepared in a manner similar to that above with 20 g methylacrylate. Isolated from solution to yield 15.5 g.

Data on the molecular weight and VCHD content of these materials are found in table 5. VCHD content was determined by nuclear magnetic resonance (NMR) spectroscopy and molecular weight was determined by gel permeation chromatography (GPC) against polystyrene standards; these methods are well known in the art.

TABLE 5

Properties of VCHD Containing Polyols

| Experiment | Monomer | VCHD in Polymer (mole %) | Number Average Molecular Weight (Daltons) |
| --- | --- | --- | --- |
| 19110-160-2 | methyl methacrylate | 0 | 26,000 |
| 19110-161 | " | 1 | 12,000 |
| 19110-158 | " | 3.5 | 5,700 |
| 19110-160-3 | butyl acrylate | 0 | 15,000 |
| 19110-165-2 | " | 7 | 7,000 |
| 19110-165-1 | " | 17 | 3,700 |
| 19110-164-1 | " | 35 | 1,700 |
| 19110-167-3 | methyl acrylate | 0 | NA |
| 19110-168-1 | " | 8 | NA |
| 19110-167-1 | " | 11 | NA |
| 19110-167-2 | " | 16 | NA |

As seen in the above table, the molecular weight of the VCHD containing materials was significantly lower than that for the control resins. For many applications, especially in coatings, the high molecular weights seen in the control examples are unsuitable. A molecular weight in the range of 500–3000 daltons is preferred. The amount of VCHD incorporation was significantly higher for the acrylate ester examples and lower for the methylmethacrylate examples. It should be possible to increase the VCHD level in the MMA case either through finding different reaction conditions or through adding some acrylate ester monomer to the MMA. Acrylate esters are typically used in combination to achieve the best possible performance.

Similar results can be accomplished using the other vinyl monomers listed above.

Coatings Performance 1 g of sample 191110-168-1 were dissolved in 1.2 g butylacetate solvent and 0.3 g of Cymel 303, a conventional commercial melamine-formaldehyde cross-linking agent, was mixed in with the acrylic polyol. This mixture was coated onto an untreated stainless steel panel using a 2 mil bar coater. This was allowed to dry and then placed in a 175° C. oven for 20 minutes to cure. Test Results are below:

| Film Thickness | 0.2 mil |
| --- | --- |
| Pencil Hardness: | H/2H |
| Cross-Hatch Adhesion: | 100% pass |
| Conical Bend | 100% pass |
| Impact (in-lbs) | |
| Direct | >160 |
| Indirect | >160 |
| MEK Double Rubs | 60–80 |

Adhesion of Tire Cord to Rubber

The Effect of VCHD on Adhesion

This example demonstrates improved rubber/polyester tire cord adhesion using VCHD. The adhesion of tire cord to a conventional tire formulation with and without VCHD was measured. The tire cord (high strength, multifilament, polyethylene terephthalate fiber) was obtained from Allied Corporation and used as received. To determine the effect of VCHD, a one foot length of tire cord was treated with a solution of modified HS-560 polyester (described above and in table 6) and melamine-formaldehyde cross-linking agent. The HS-560 is a polyester polyol oligomer prepared from an approximately equal molar combination of adipic acid, isophthalic acid, neopentyl glycol, and VCHD as described above. The precise formulation and amount of melamine crosslinker are shown in table 7. The fiber was dipped in the coating and dried at 170° C. for 30 minutes. The fiber gained 11% by weight. The coated and uncoated tire cord were subjected to an adhesion test (ASTM D-4776, which is well known in the art).

In the test, ASTM D4776, uncured rubber is placed in an H shaped mold, tire cord is laid across the center bar of the H encased in the rubber, and the system heat cured (20 minutes at 350° F.). The specimen is tested on an Instron type tensile tester with the polyester fiber oriented in the machine direction. The stress is concentrated on the center bar of the H where the fiber and rubber are combined. The rubber formulation and cure conditions used in the test are given in table 7. These conditions are conventional for tire construction. Five samples were tested and the values averaged. Results are shown in FIG. 1 and FIG. 2.

The stress-strain plots show two distinct maxima. In the test, the stress increases rapidly with little sample elongation. Initially, the fiber prevents the rubber from stretching. When the rubber-tire cord interfaces fails, the fiber is pulled from the rubber and the strain drops rapidly to the value of the cured rubber itself. From this point onward, the test resembles a typical rubber tensile test. The stress and strain both increase steadily until the sample breaks. This forms the second maxima. The force at the point of interfacial failure, the first maxima, is the polyester-rubber adhesion. The untreated cord gave an average adhesion of 2.8 lb-force. The treated cord gave a value of 5.5 lb-force. The second maxima is the tensile strength of the rubber itself, about 5.7 lb-force.

The appearance of the specimens after testing is also important to understanding the results. In a conventional adhesive system, the polyester cord will have particles of rubber adhering to it after it has been pulled from the fiber. This indicates that the rubber, not the rubber-fiber interface, fails. This was not observed in this experiment. For both samples, the fiber was cleanly pulled from the rubber. The yield point of the rubber, 5.7 lb-force, is slightly higher than the measured adhesion value. Without being bound by theory, if the adhesion was increased to over 6.0 lb-force, the rubber would fail before the rubber-fiber interface.

This simple experiment demonstrates that VCHD can improve adhesion of rubber and polyester. The treated cord showed an adhesion of over twice that of the untreated sample.

Without being bound by theory, although this example was done with a VCHD containing coating, it is expected that similar results would be obtained if the VCHD was added to the system in a different manner, such as incorporation into the PET fiber itself. This could be accomplished by blending a VCHD containing polymer or oligomer into the PET fiber resin or by co-polymerizing VCHD into the PET itself. A bicomponent sheath-core system with a VCHD containing sheath attached to a PET core, would also be expected to show significant improvement in adhesion while maintain the strength characteristics of PET.

TABLE 6

Composition of Modified HS-560 Coating and Crosslinking Agent[1]

| Material | Amount | Weight Percent |
|---|---|---|
| Polyester Formulation | 32 | 14.0 |
| Adipic Acid | | (16)[2] |
| Isophthalic Acid | | (20) |
| Neopentyl Glycol | | (16) |
| Vinyl Cyclohexanediol | | (26) |
| Trimethanolpropane | | (3) |
| Butyl Acetate | (16%) | |
| Crosslinking Agent | | |
| Cymel 303, Melamine | 10.3 | 6.0 |
| Paratoluene sulfonic acid | 0.42 | 0.2 |
| Butyl acetate | 129 | 79.8 |
| | 171.7 | |

1. Soak fiber in above solution for fifteen minutes, wrap on frame, and bake twenty minutes at 350° F.
2. Number in parentheses is weight percent of component in polyester formulation.

TABLE 7

Rubber Formulation and Cure Conditions

| Material | Function | Weight Percent |
|---|---|---|
| SIR 10 Natural Rubber | Rubber | 41.2 |
| Polybutadiene 1220 | Rubber | 17.8 |
| GPF N660 Carbon Black | Filler | 29.6 |
| Sundex 790 Process Oil | Process Aid | 4.7 |
| Agerlite Superlite | Stabilizer | 0.6 |
| Arofene 1055 B Resin | Process Aid | 1.8 |
| Zinc Oxide | Cure | 1.8 |
| Stearic Acid | Stabilizer/Process Aid | 0.6 |
| AMAX Accelerator | Cure Accelerator | 0.5 |
| Rubber Makers Sulfur | Cure | 1.2 |

Thus, in view of the above, the invention concerns, in part, the following:

A resin composition comprising vinyl-3,4-cyclohexanediol, at least one carboxylic acid or ester thereof or anhydride, and optionally a polyol or diol other than vinyl-3,4-cyclohexanediol.

The above resin composition wherein said carboxylic acid is selected from the group consisting of terephthalic acid, isophthalic acid, adipic acid, 1,4-cyclohexanedicarboxylic acid, and mixtures thereof.

The above resin composition wherein said anhydride is selected from the group consisting of phthalic anhydride, trimellitic anhydride, maleic anhydride, and mixtures thereof.

The above resin composition wherein said ester is selected from the group consisting of dialkylterephthalate, dialkylisophthalate, dialkyladipate, and mixtures thereof.

The above resin composition wherein said polyol or diol other than vinyl-3,4-cyclohexanediol is selected from the group consisting of neopentyl glycol, ethylene glycol, polyethylene glycol, propylene glycol, polypropylene glycol, 1,4-butanediol, 1,6-hexanediol, glycerol, trimethylolpropane, trimethylolethane, pentaerythritol, 1,4-cyclohexanedimethanol, 2-methyl-1,3-propanediol, 1,3-propanediol, and mixtures thereof.

The above resin composition wherein said resin composition does not contain α,β-unsaturated dicarbonic acid.

The above resin composition wherein the amount of vinyl-3,4-cyclohexanediol incorporated in said resin composition is from about 1 mole % to 66 mole %.

The above resin composition wherein the molecular weight of said resin composition is from about 500 to about 100,000 daltons.

The above resin composition wherein the molecular weight of said resin composition is from about 500 to about 20,000 daltons.

The above resin composition wherein the molecular weight of said resin composition is from about 1000 to about 5,000 daltons.

The above resin composition wherein said vinyl-3,4-cyclohexanediol is 1–100% of the diol/polyol component of said resin composition.

The above resin composition wherein said vinyl-3,4-cyclohexanediol is 1–25% of the diol/polyol component of said resin composition.

The above resin composition wherein said resin composition is produced by a process comprising mixing in a nitrogen atmosphere vinyl-3,4-cyclohexanediol, at least one carboxylic acid or ester thereof or anhydride, and optionally a polyol or diol other than vinyl-3,4-cyclohexanediol to form a mixture and heating said mixture to about 180° up to about 290° C. until the desired level of polymerization is reached to form said resin composition.

A process for preparing the above resin composition which comprises mixing in a nitrogen atmosphere vinyl-3,4-cyclohexanediol, at least one carboxylic acid or ester thereof or anhydride, and optionally a polyol or diol other than vinyl-3,4-cyclohexanediol to form a mixture and heating said mixture to about 180–290° C. until the desired level of polymerization is reached to form said resin composition.

The above process wherein said mixture contains a butyl tin oxide condensation catalyst.

The above process wherein said vinyl-3,4-cyclohexanediol is 1–100% of the diol/polyol component of said resin composition.

A copolymer comprising a vinyl-3,4-cyclohexanediol containing resin composition and at least one monomer selected from the group consisting of acrylic acid, methacrylic acid, alkyl acrylate, alkyl methacrylate, styrene, acrylonitrile, butadiene, isoprene, vinyl acetate, maleic anhydride, ethylene, fumarate and maleate esters, and mixtures thereof, wherein said vinyl-3,4-cyclohexanediol containing resin composition comprises vinyl-3,4-cyclohexanediol, at least one carboxylic acid or ester thereof or anhydride, and optionally a polyol or diol other than vinyl-3,4-cyclohexanediol.

The above copolymer wherein said alkyl acrylate is butyl acrylate.

The above copolymer wherein said alkyl methacrylate is methylmethacrylate.

A process for preparing the above copolymer comprising reacting a vinyl-3,4-cyclohexanediol containing resin composition and at least one monomer selected from the group consisting of acrylic acid, methacrylic acid, alkyl acrylate, alkyl methacrylate, styrene, acrylonitrile, butadiene, isoprene, vinyl acetate, ethylene and mixtures thereof, wherein said vinyl-3,4-cyclohexanediol containing resin composition comprises vinyl-3,4-cyclohexanediol, at least one carboxylic acid or ester thereof or anhydride, and optionally a polyol or diol other than vinyl-3,4-cyclohexanediol.

A film or coating comprising the above copolymer.

A compound suitable for the preparation of resin compositions comprising vinyl-3,4-cyclohexanediol.

A copolymer comprising vinyl-3,4-cyclohexanediol and at least one monomer selected from the group consisting of acrylic acid, methacrylic acid, alkyl acrylate, alkyl methacrylate, styrene, acrylonitrile, butadiene, isoprene, vinyl acetate, maleic anhydride, ethylene, vinyl chloride, vinylidene dichloride, methyl styrene, vinyl toluene, acrylic and methacrylic acid, vinyl acetate, maleic anhydride, fumarate esters, maleate esters, vinylidene difluoride, vinyl fluoride, acrylic or methacrylic esters of the formula (I)

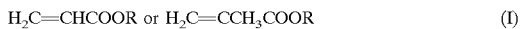

$$H_2C=CHCOOR \text{ or } H_2C=CCH_3COOR \qquad (I)$$

where R is a aromatic or aliphatic hydrocarbon group containing 20 or fewer carbons and optionally containing oxygen, sulfur, or phosphorous, and mixtures thereof.

The above copolymer wherein the amount of vinyl-3,4-cyclohexanediol incorporated in said copolymer is from about 0.1% to about 70% by weight.

The above copolymer wherein the amount of vinyl-3,4-cyclohexanediol incorporated in said copolymer is from about 1% to about 30% by weight.

The above copolymer wherein the amount of vinyl-3,4-cyclohexanediol incorporated in said copolymer is from about 5% to about 15% by weight.

The above copolymer wherein said copolymer is produced by a process comprising reacting vinyl-3,4-cyclohexanediol and at least one monomer.

A process for preparing the above copolymer which comprises reacting vinyl-3,4-cyclohexanediol and at least one monomer selected from the group consisting of acrylic acid, methacrylic acid, alkyl acrylate, alkyl methacrylate, styrene, acrylonitrile, butadiene, isoprene, vinyl acetate, maleic anhydride, ethylene, vinyl chloride, vinylidene dichloride, methyl styrene, vinyl toluene, acrylic and methacrylic acid, vinyl acetate, maleic anhydride, fumarate esters, maleate esters, vinylidene difluoride, vinyl fluoride, acrylic or methacrylic esters of the formula (I)

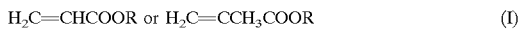

$$H_2C=CHCOOR \text{ or } H_2C=CCH_3COOR \qquad (I)$$

where R is a aromatic or aliphatic hydrocarbon group containing 20 or fewer carbons and optionally containing oxygen, sulfur, or phosphorous, and mixtures thereof, to form said copolymer.

Further variations and modifications of the invention will become apparent to those skilled in the art from the foregoing and are intended to be encompassed by the claims appended hereto.

That which is claimed is:

1. A resin composition comprising vinyl-3,4-cyclohexanediol, at least one carboxylic acid or ester thereof or anhydride, and optionally a polyol or diol other than vinyl-3,4-cyclohexanediol, wherein said carboxylic acid is selected from the group consisting of terephthalic acid, isophthalic acid, adipic acid, 1,4-cyclohexanedicarboxylic acid, and mixtures thereof.

2. The resin composition according to claim 1 wherein said anhydride is selected from the group consisting of phthalic anhydride, trimellitic anhydride, maleic anhydride, and mixtures thereof.

3. The resin composition according to claim 2 wherein said ester is selected from the group consisting of dialkylterephthalate, dialkylisophthalate, dialkyladipate, and mixtures thereof.

4. The resin composition according to claim 3 wherein said polyol or diol other than vinyl-3,4-cyclohexanediol is selected from the group consisting of neopentyl glycol, ethylene glycol, polyethylene glycol, propylene glycol, polypropylene glycol, 1,4-butanediol, 1,6-hexanediol, glycerol, trimethylolpropane, trimethylolethane, pentaerythritol, 1,4-cyclohexanedimethanol, 2-methyl-1,3-propanediol, 1,3-propanediol, and mixtures thereof.

5. The resin composition according to claim 4 wherein said resin composition does not contain $\alpha,\beta$-unsaturated dicarbonic acid.

6. A process for preparing the resin composition according to claim 1 which comprises mixing in a nitrogen atmosphere vinyl-3,4-cyclohexanediol, at least one carboxylic acid or ester thereof or anhydride, and optionally a polyol or diol other than vinyl-3,4-cyclohexanediol to form a mixture and heating said mixture to about 180–290° C. in the presence of a butyl tin oxide condensation catalyst until the desired level of polymerization is reached to form said resin composition.

* * * * *

UNITED STATES PATENT AND TRADEMARK OFFICE
CERTIFICATE OF CORRECTION

PATENT NO. : 6,020,455
DATED : February 1, 2000
INVENTOR(S) : Wayne Robert Pretzer, Matthew Albert Kulzick, Paul Alan Koning, Asare Nkanasah, Marie Curry-Nkansah It is certified that error appears in the above-indentified patent and that said Letters Patent is hereby corrected as shown below:

| Col. | Line |
|---|---|
| IN THE ABSTRACT: | There should be a paragraph break between the sentence ending, "and mixtures thereof.", and the sentence beginning, "A resin composition". |
| 9 | (Table 1) | "Comments<br>VCHD in first stage, gray polymer²"<br><br>should read:<br>"Comments<br>VCHD in first stage, gray polymerᵉ" |
| 12 | 9 | "19530-514, gel formation"<br><br>should read:<br>"19530-51-4, gel formation" |

UNITED STATES PATENT AND TRADEMARK OFFICE
CERTIFICATE OF CORRECTION

PATENT NO. : 6,020,455

DATED : February 1, 2000

INVENTOR(S) : Wayne Robert Pretzer, Matthew Albert Kulzick, Paul Alan Koning, Asare Nkansah, Maria Curry-Nkansah It is certified that error appears in the above-indentified patent and that said Letters Patent is hereby corrected as shown below:

| Col. | Line |  |
|---|---|---|
| 13,14 | (Table 4) | Data Preceding "trix, 1 u PE sphere"<br><br>Should be moved to the next line, before Two phase, no phase", in the next line. |
| 14 | 60 | "charged to a keftle"<br><br>should read:<br>"charged to a kettle" |
| 19 | 4,5 | "Resin and Coating Evaluations<br><br>       81.9       77.9"<br><br>should read:<br>"Resin and Coating Evaluations<br>    Control    VCHD Modified<br>     81.9      77.9" |

UNITED STATES PATENT AND TRADEMARK OFFICE
CERTIFICATE OF CORRECTION

PATENT NO. : 6,020,455
DATED : February 1, 2000
INVENTOR(S) : Wayne Robert Pretzer, Mathew Albert Kulzick, Paul Alan Koning, Asare Nkanasah, Marie Curry-Nkansah It is certified that error appears in the above-indentified patent and that said Letters Patent is hereby corrected as shown below:

| Col. | Line |  |
|---|---|---|
| 21 | 53,54 | "2nd Stage       96.5     94     97     93<br><br>Isophthalic acid"<br><br>should read:<br>"2nd Stage<br><br>Isophthalic acid     96.5     94     97     93" |
| 23 | 29 | "washing 4xwith equal"<br><br>should read:<br>"washing 4x with equal" |
| 25 | 14 | "ASTM D4776,"<br><br>should read:<br>"ASTM D-4776," |

Signed and Sealed this

Twentieth Day of March, 2001

Attest:

NICHOLAS P. GODICI

Attesting Officer

Acting Director of the United States Patent and Trademark Office